US010450946B2

(12) United States Patent
Yamada et al.

(10) Patent No.: US 10,450,946 B2
(45) Date of Patent: *Oct. 22, 2019

(54) TURBOCHARGER SYSTEM HAVING AN AIR-COOLED WASTEGATE ACTUATOR

(71) Applicant: Ford Global Technologies, LLC, Dearborn, MI (US)

(72) Inventors: Shuya Shark Yamada, Novi, MI (US); Timothy J. Gardner, Wyandotte, MI (US); Christopher David Tiernan, Commerce Township, MI (US); Matthew Coon, Madison Heights, MI (US); Shawn Michael Spannbauer, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

This patent is subject to a terminal disclaimer.

(21) Appl. No.: 15/810,577

(22) Filed: Nov. 13, 2017

(65) Prior Publication Data

US 2018/0066576 A1 Mar. 8, 2018

Related U.S. Application Data

(63) Continuation of application No. 14/622,432, filed on Feb. 13, 2015, now Pat. No. 9,822,696.

(51) Int. Cl.
*F02B 37/18* (2006.01)
*F01P 1/08* (2006.01)
*F01P 7/02* (2006.01)

(52) U.S. Cl.
CPC ............ *F02B 37/186* (2013.01); *F01P 1/08* (2013.01); *F01P 7/026* (2013.01); *Y02T 10/144* (2013.01)

(58) Field of Classification Search
CPC ...... F02B 37/186; F02B 37/183; F02B 37/18; F02B 37/16; F02B 37/225; F02B 29/0406; F01P 1/08; F01P 7/026; Y02T 10/144

See application file for complete search history.

(56) References Cited

U.S. PATENT DOCUMENTS

| 2,967,518 | A | * | 1/1961 | Zuhn | F01P 3/14 123/188.9 |
| 4,250,710 | A | * | 2/1981 | Matsuoka | F02B 37/186 60/602 |
| 4,418,535 | A | * | 12/1983 | Ecomard | F02B 37/183 60/602 |
| 4,463,564 | A | * | 8/1984 | McInerney | F01D 17/105 137/892 |
| 4,630,445 | A | * | 12/1986 | Parker | F02B 37/183 137/339 |
| 5,899,196 | A | | 5/1999 | Chite | |

(Continued)

*Primary Examiner* — Patrick D Maines
(74) *Attorney, Agent, or Firm* — Geoffrey Brumbaugh; McCoy Russell LLP

(57) ABSTRACT

A system and methods for a vehicle are provided for adjusting each of a speed of a radiator fan and a position of grille shutters of the vehicle responsive to a temperature at a wastegate exceeding a temperature threshold. In one example, a system may include a radiator fan at a front end of a vehicle, an engine coupled to an exhaust passage, a turbine in the exhaust passage having a bypass conduit, a wastegate positioned in the turbine conduit, and the wastegate receiving airflow from downstream of the radiator fan via a cooling duct.

10 Claims, 9 Drawing Sheets

(56) References Cited

U.S. PATENT DOCUMENTS

| | | | |
|---|---|---|---|
| 6,658,848 B1* | 12/2003 | Pierpont | F02B 37/013 60/602 |
| 8,186,153 B2 | 5/2012 | Schindler et al. | |
| 9,004,241 B2 | 4/2015 | Browne et al. | |
| 2010/0043429 A1* | 2/2010 | Wolk | F02B 37/18 60/602 |
| 2011/0281515 A1 | 11/2011 | Lockwood et al. | |
| 2012/0171059 A1 | 7/2012 | Love et al. | |
| 2014/0026560 A1 | 1/2014 | Dobrowolski | |
| 2014/0047832 A1* | 2/2014 | Matthews | F02B 37/186 60/599 |
| 2014/0109846 A1 | 4/2014 | Styles et al. | |
| 2014/0109870 A1 | 4/2014 | Glugla et al. | |

\* cited by examiner

TURBOCHARGER SYSTEM HAVING AN AIR-COOLED WASTEGATE ACTUATOR

CROSS REFERENCE TO RELATED APPLICATION

The present application is a continuation of U.S. patent application Ser. No. 14/622,432, entitled "TURBOCHARGER SYSTEM HAVING AN AIR-COOLED WASTEGATE ACTUATOR," filed on Feb. 13, 2015. The entire contents of the above-referenced application are hereby incorporated by reference in its entirety for all purposes.

FIELD

The present disclosure relates to cooling an actuator of a wastegate in a turbocharger system in a vehicle.

BACKGROUND/SUMMARY

Turbochargers may be used in engines to increase the power output of the engine for a given displacement as compared to a naturally aspirated engine. It may be desirable to decrease the flow path between the turbine in the turbocharger and the combustion chambers by positioning the turbine close to the exhaust ports of the cylinders. Such positioning decreases losses in the exhaust gas flow, thereby enabling the speed of the turbine to increase. The increased turbine speed increases the amount of compression provided by the compressor. As a result, the power output of the engine may be increased.

However, due to the proximity of the turbine to the combustion chamber, the turbine and surrounding components may experience elevated temperatures. In some engines the exhaust manifold and turbine housing may have radiating surface temperatures over 900° C. Consequently, the turbine and surrounding components, such as a wastegate and an actuator of the wastegate, may experience thermal degradation, thus decreasing component longevity. For example, an electrically actuated wastegate (EAWG) may become inoperable at higher temperatures due to temperature-sensitive control components included therein. As an example, a wastegate actuator and its circuitry may significantly degrade at elevated temperatures affecting wastegate control and engine performance.

An example approach to cooling a wastegate actuator is shown by Matthews in US 2014/0047832. Herein, the wastegate actuator receives cooling air via a conduit from upstream of an intake compressor. However, the inventors herein have recognized a potential issue with the example approach shown by Matthews. As an example, intake airflow may be insufficient to cool the wastegate actuator during certain engine conditions. During boosted conditions, a substantial portion of intake airflow may be drawn into the intake compressor for combustion while a significantly smaller portion of intake airflow may enter the conduit towards the wastegate actuator. Accordingly, the wastegate actuator may not be cooled adequately resulting in an increased likelihood of thermal degradation.

One approach that at least partially addresses the above issue includes an example system for a vehicle, comprising a radiator fan at a front end of a vehicle, an engine coupled to an exhaust passage, a turbine positioned in the exhaust passage, a bypass conduit in fluidic communication with a turbine inlet and a turbine outlet, a wastegate positioned in the bypass conduit, and a wastegate actuator adjusting a position of the wastegate, the wastegate actuator receiving airflow from downstream of the radiator fan via a cooling duct. In this way, the wastegate may be cooled during different engine conditions by air received via the cooling duct from the radiator fan.

Another example approach includes a method for a boosted engine in a vehicle, comprising adjusting each of a speed of a radiator fan and a position of grille shutters of the vehicle responsive to a temperature at a wastegate exceeding a temperature threshold. Thus, the radiator fan and grille shutters may facilitate cooling of the wastegate (and a wastegate actuator).

For example, a boosted engine in a vehicle may include an intake compressor driven by an exhaust turbine. A wastegate may be positioned in a bypass conduit coupled across the exhaust turbine. As such, a position of the wastegate may be adjusted by a wastegate actuator based on a desired flow of exhaust gases across the exhaust turbine. The wastegate actuator (and the wastegate) may receive cooling airflow from a front of the vehicle via a cooling duct. Specifically, a first end of the cooling duct may receive airflow from downstream of each of a radiator fan and grille shutters, and transfer the airflow via a second end of the cooling duct to the wastegate actuator (and the wastegate). Further still, a speed of the radiator fan and a position of the grille shutters may be adjusted in response to a temperature of the wastegate, and the wastegate actuator. When an estimated temperature of the wastegate (and the wastegate actuator) exceeds a temperature threshold, the speed of the radiator fan and/or the position of the grille shutters may be varied to provide cooling airflow via the cooling duct to the wastegate and wastegate actuator.

In this way, a wastegate and a wastegate actuator may be cooled to reduce component degradation. By using airflow from the radiator fan and grille shutters, the wastegate actuator may be cooled when desired. Further, airflow directed towards the wastegate actuator may not depend on existing engine conditions. As such, the radiator fan may be actuated in response to heating of the wastegate and may not be based on other engine parameters. Thermal stress on the wastegate may be reduced by the cooling airflow enabling an increase in the longevity of the wastegate and wastegate actuator. The air flow received from the radiator fan and grille shutters may also cool the exhaust turbine and the exhaust manifold. Thus, durability and integrity of these components may be maintained and/or extended. Overall, degradation of components may be diminished and a decrease in maintenance costs may be provided.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
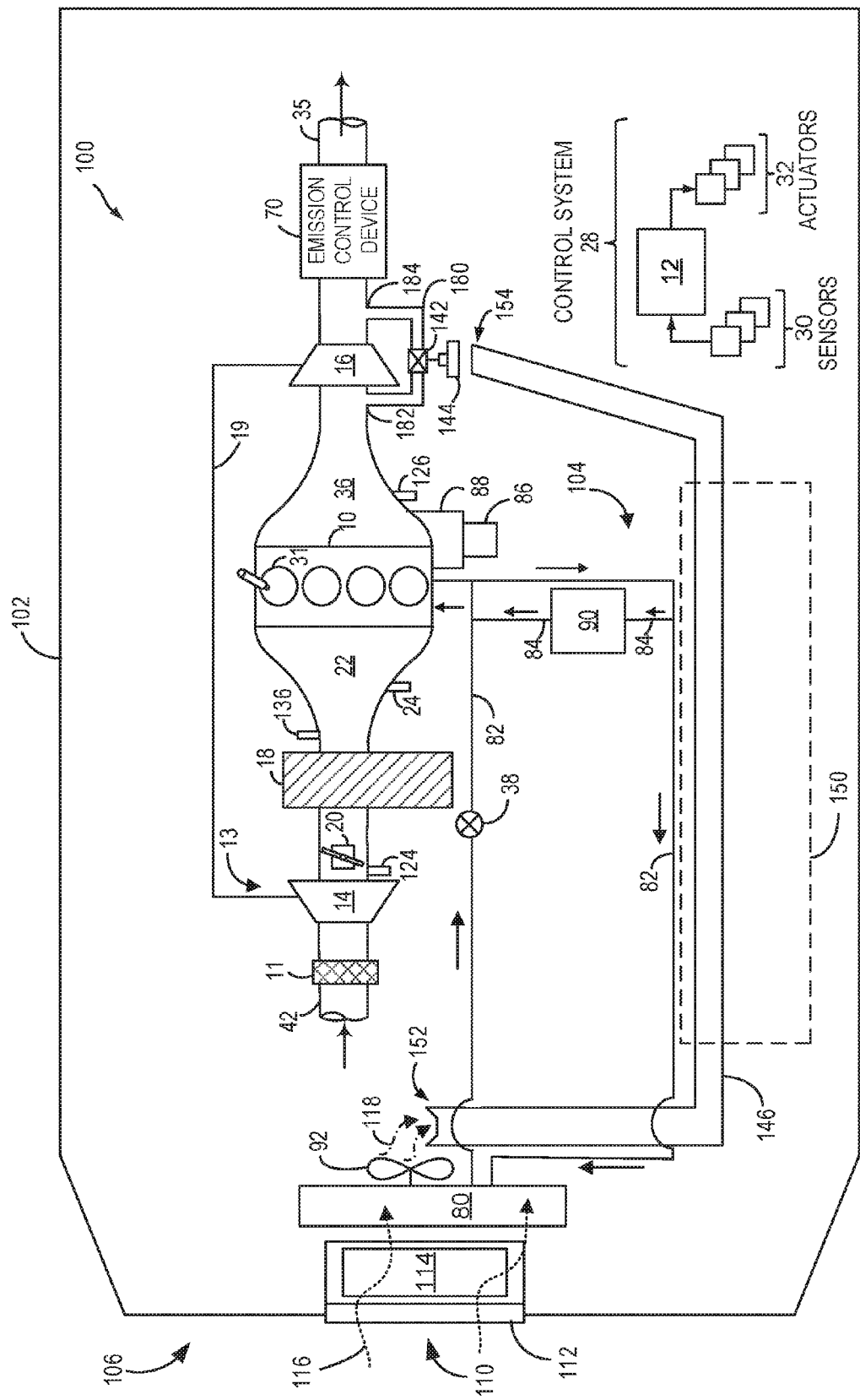
FIG. 1 shows a schematic example vehicle system according to the present disclosure.
Figure 2:
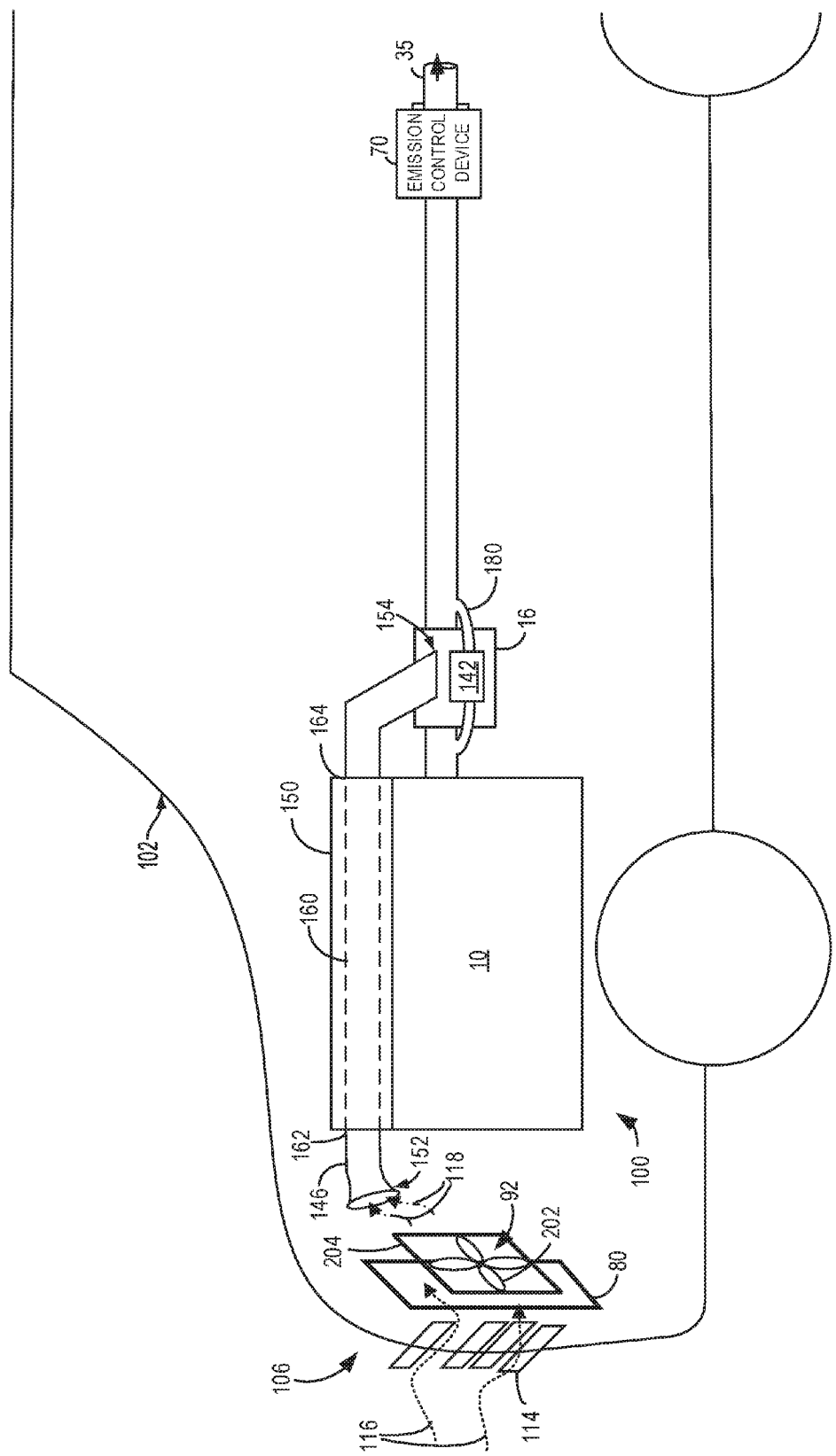
FIG. 2 depicts another schematic view of the example vehicle system of FIG. 1 in accordance with the present disclosure.
Figure 3:
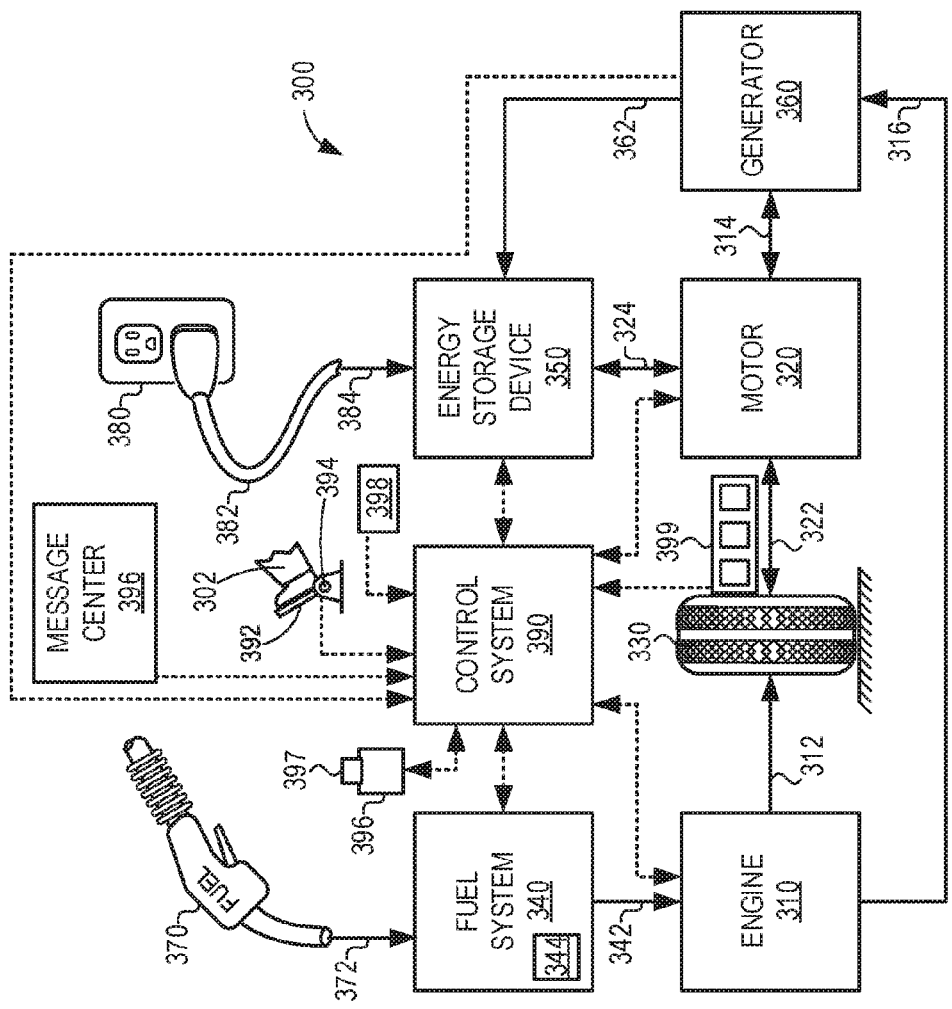
FIG. 3 illustrates a schematic diagram of a hybrid-electric vehicle (HEV).
Figure 4:
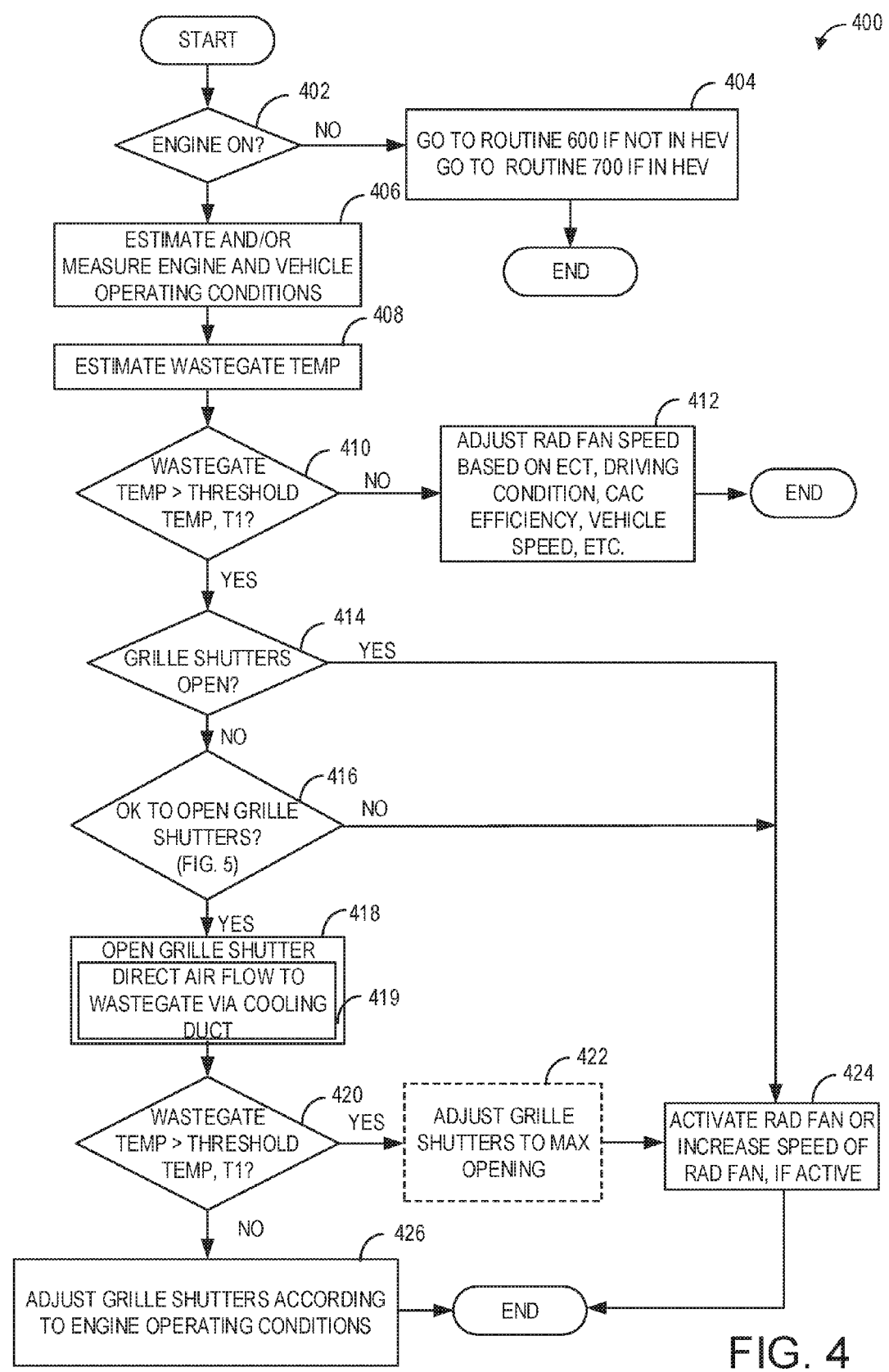
FIG. 4 presents an example method for adjusting a position of grille shutters and speed of a radiator fan based on wastegate temperature.
Figure 8:
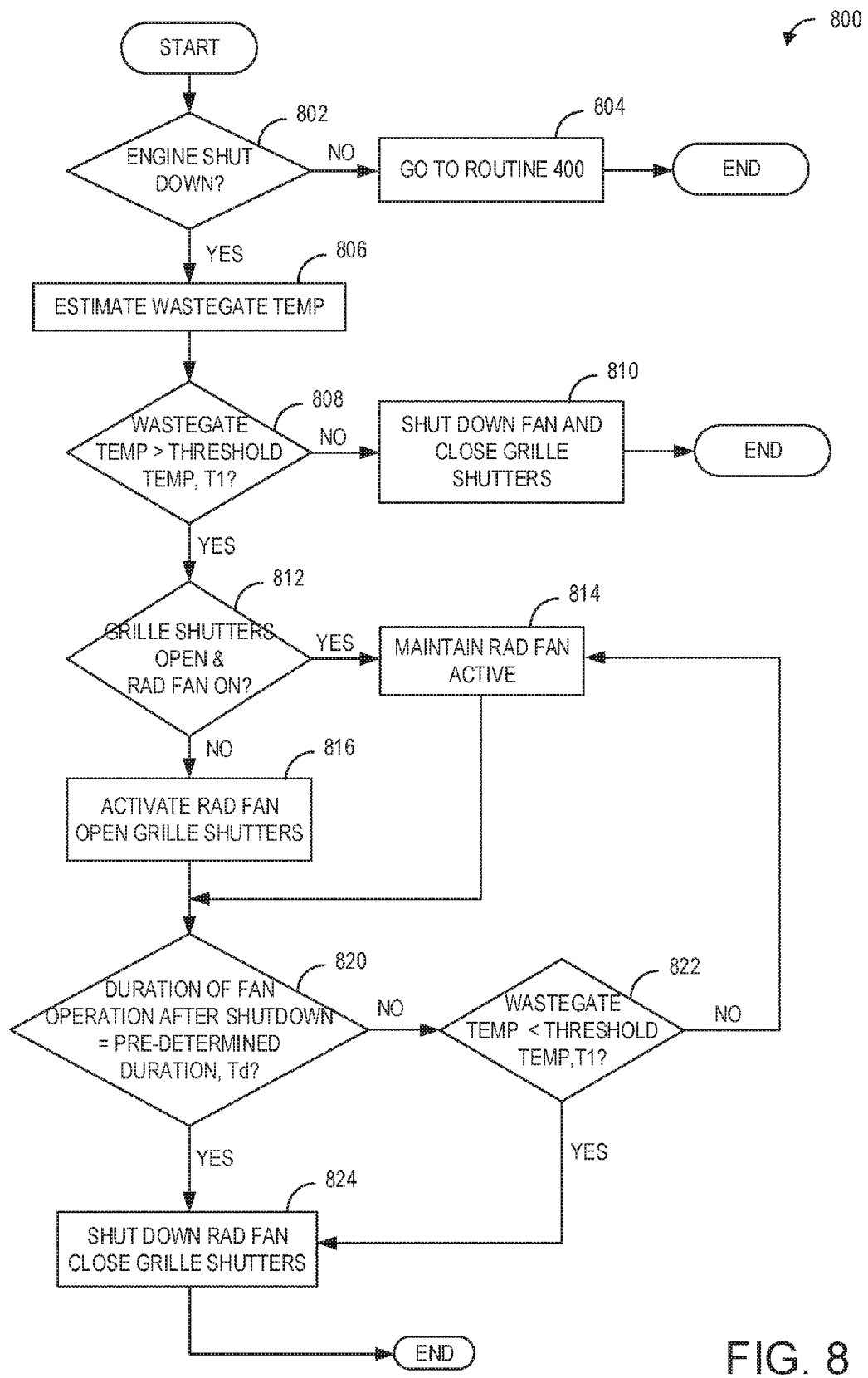
FIG. 8 is an example method for adjusting a position of grille shutters and speed of a radiator fan after engine shut down in a non-HEV vehicle.
Figure 9:
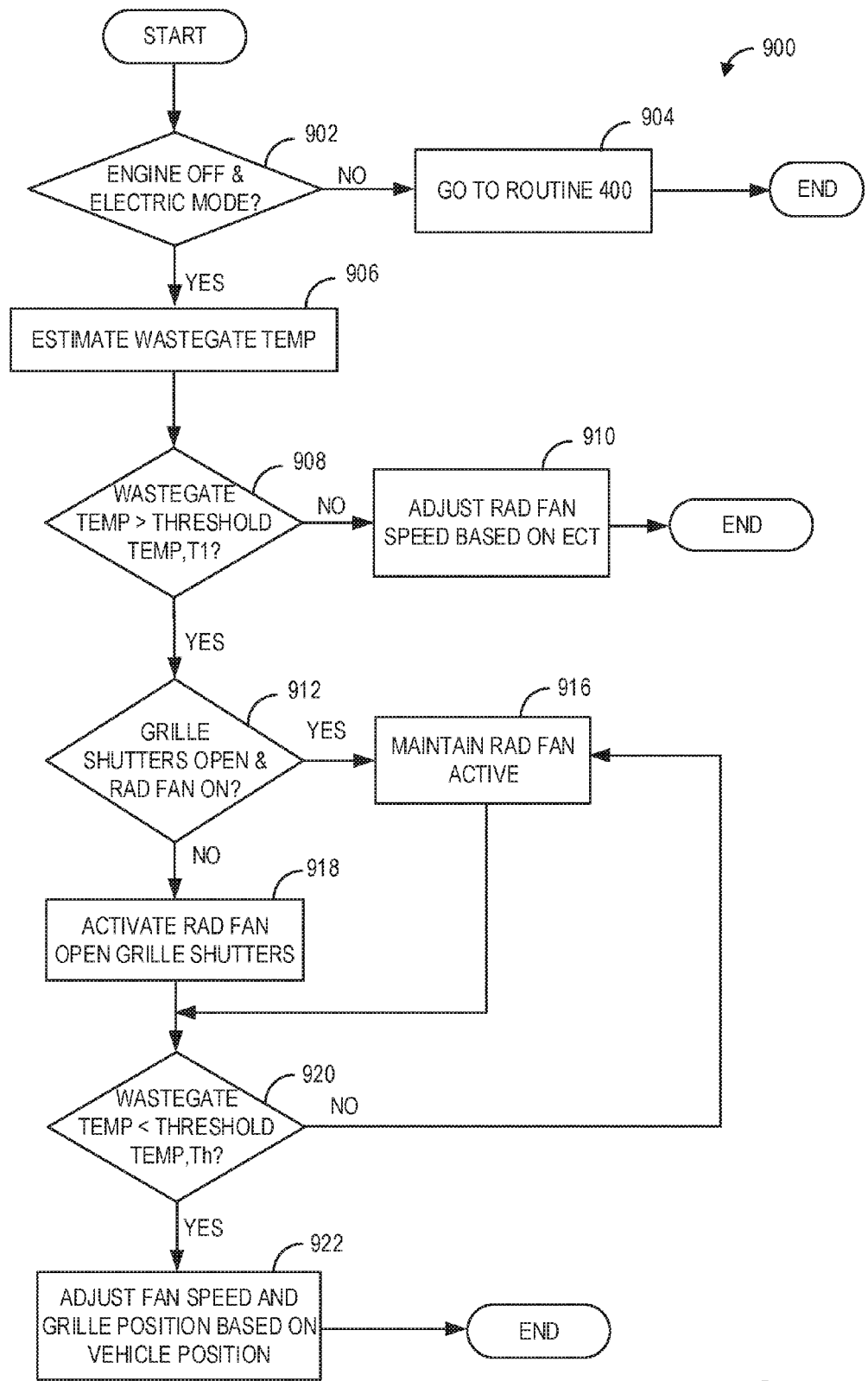
FIG. 9 depicts an example method for adjusting a position of grille shutters and a speed of a radiator fan after engine shut down in a HEV.
Figure 10:
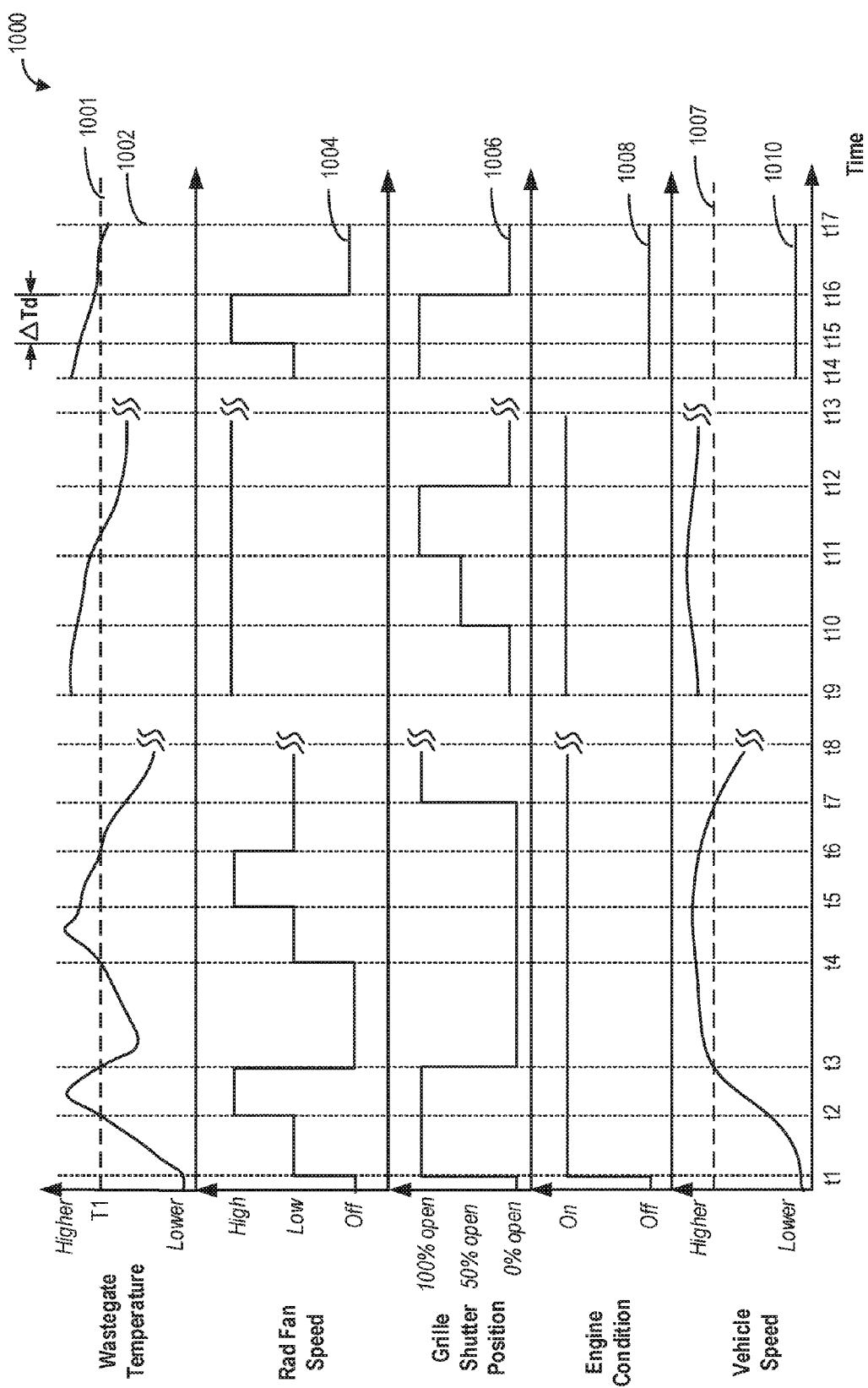
FIG. 10 shows an example adjusting of a position of grille shutters and a speed of a radiator fan based on wastegate temperature.

The following description relates to methods and systems for cooling a wastegate and a wastegate actuator within an engine system included in a vehicle system, such as the example vehicle systems shown in FIGS. 1-3. In particular, a portion of air directed by a radiator fan positioned at a front of the vehicle may be streamed through a cooling duct towards the wastegate and the wastegate actuator. In one example, the portion of air may be received via grille shutters and then directed by the radiator fan towards the cooling duct. A position of the grille shutters and a speed of the radiator fan may each be adjusted based on a temperature at the wastegate (FIG. 4). The position of the grille shutters (FIG. 5) may also be based on vehicle speed. During vehicle conditions when the position of the grille shutters may not be adjusted, the speed of the radiator fan alone may be modified (FIG. 6). As such, the radiator fan may be activated and operated based on vehicle speed (FIG. 7) and may be further adjusted based on wastegate temperature. In order to ensure adequate cooling of the wastegate and wastegate actuator following engine shut down, cooling airflow may be directed towards the wastegate and wastegate actuator by adjusting the position of grille shutters and the speed of the radiator fan (FIG. 8). Further still, the wastegate and wastegate actuator may be cooled following engine deactivation in a hybrid vehicle by adjusting the speed of the radiator fan and the position of the grille shutters (FIG. 9). Example grille shutter and radiator fan speed adjustments are shown in FIG. 10.

FIG. 1 shows an example embodiment of an engine system 100, in a motor vehicle 102, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input, exhaust manifold temperature, air-fuel ratio, vehicle speed, engine speed, mass airflow through the engine, boost pressure, ambient temperature, ambient humidity, intake air temperature, etc.), cooling system sensors (such as coolant temperature, radiator fan speed, passenger compartment temperature, ambient humidity, etc.), charge air cooler sensors, coolant pump speed, and others. The controller may also send a plurality of control signals to various engine actuators 32 in order to adjust engine operation based on signals received from the sensors 30. For example, actuators 32 may include a wastegate actuator 144 for adjusting a position of a wastegate 142, and various other actuators for adjusting a position of throttle valve 20, adjusting operation and/or speed of a radiator fan, adjusting exhaust gas recirculation (EGR) flow via adjusting an EGR valve (not shown), and the like.

In the depicted embodiment, engine 10 is a boosted engine coupled to a turbocharger 13 including a compressor 14 (also termed intake compressor 14) driven by a turbine 16 (also termed, exhaust turbine 16). Specifically, fresh air is introduced along intake passage 42 into engine 10 via air cleaner 11 and flows to compressor 14. The compressor may be a suitable intake-air compressor, such as a motor-driven or driveshaft driven supercharger compressor. In the engine system 100, the compressor 14 is shown as a turbocharger compressor mechanically coupled to turbine 16 via a rotating shaft 19, the turbine 16 driven by expanding engine exhaust. As such, the speed of the compressor 14 may be based on the speed of the turbine 16. Since flow through the compressor can heat the compressed air, a charge air cooler (CAC) 18 is provided downstream of the compressor 14 so that boosted intake charge air can be cooled prior to delivery to the engine intake. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through CAC 18 to throttle valve 20. The CAC may be an air-to-air or air-to-water heat exchanger, for example. Throttle valve 20 is coupled to engine intake manifold 22 downstream of compressor 14 but upstream of CAC 18. In an alternate embodiment, the throttle valve 20 may be coupled to the engine intake manifold 22, downstream of the CAC 18. A position of throttle valve 20 may be modified based on engine conditions to control airflow received from compressor 14. From the compressor, the hot compressed air charge enters the inlet of the CAC 18, cools as it travels through the CAC 18, and then exits into the intake manifold 22.

In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is fluidically coupled to a series of combustion chambers 31 (also termed cylinders 31) through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from exhaust manifold 36 is directed to turbine 16 to drive the turbine. Turbine 16 may be coupled in exhaust passage 35. When reduced turbine torque is desired, a portion of exhaust gases may be directed instead through a wastegate 142 bypassing the turbine. Specifically, wastegate 142 may be included in a turbine bypass conduit 180 coupled between an inlet and outlet of the exhaust turbine 16. As depicted in FIG. 1, turbine bypass conduit 180 is in fluidic communication with an inlet of turbine 16 (also termed turbine inlet 182) and an outlet of turbine 16 (also termed turbine outlet 184). In other words, an inlet of the turbine bypass conduit is coupled to the exhaust passage 35 upstream of the turbine 16 and an outlet of the turbine bypass conduit is coupled to the exhaust passage 35 downstream of the turbine 16. Therefore, the turbine bypass conduit 180 is in fluidic communication with the turbine inlet 182 and the turbine outlet 184. By adjusting a position of wastegate 142, an amount of boost provided by the exhaust turbine may be controlled. In some embodiments, wastegate 142 may be a multi-staged wastegate, such as a two-staged wastegate with a first stage configured to control boost pressure and a second stage configured to increase heat flux to emission control device 70.

In the depicted example embodiment, the wastegate 142 may include a wastegate valve, wherein the wastegate valve may be controlled by an associated wastegate actuator 144. A wastegate valve may be controlled based on operating conditions to achieve the desired boost. In one example, wastegate actuator 144 may comprise a solenoid and/or a motor for adjusting the wastegate, and is configured to send signals and receive feedback to and/or from a controller, such as controller 12. In one example, wastegate 142 may be an electrically actuated wastegate (EAWG). The wastegate actuator 144 may transmit a driving force via a linkage (e.g., a cylindrical rod) to the wastegate valve, which may transition between a fully closed position and a fully open position, and may settle at any position therebetween. In this way, wastegate actuator 144 converts electrical control signals received from controller 12 into mechanical actuation. Consequently, wastegate actuator 144 is driven to alter the wastegate position, thereby controlling the amount of exhaust gas reaching the turbine 16 to achieve a desired boost.

The position of the wastegate valve may be continuously variable, and may be monitored via a position sensor (not shown) configured to send signals to an engine controller such as controller 12. Specifically, in one example, controller 12 may relay signals to open or close wastegate 142 based on engine operating conditions (e.g., engine speed and/or engine load).

Wastegate actuator 144 and wastegate 142 may be exposed to extremely high temperatures, and resulting degradation, due to their proximity and exposure to exhaust gases. Accordingly, the wastegate and the associated wastegate actuator may need to be cooled.

As will be described below, a cooling duct 146 may transfer cooling airflow from downstream of each of a radiator fan 92 and grille shutters 114 to wastegate actuator 144 to reduce wastegate temperature. A temperature of the wastegate 142 may be estimated by controller 12 based on one or more engine operating conditions, such as engine load and/or speed, ambient temperature, exhaust temperature, etc. Alternatively, the temperature at the wastegate may be calculated by mathematical models derived from the aforementioned operating conditions. In another example, controller 12 may determine wastegate temperature from one or more measurements by a temperature sensor (not shown) positioned at a location adjacent to or in the exhaust manifold. In yet another example, wastegate temperature may be determined by a temperature sensor (not shown) coupled adjacent to the wastegate 142 and/or wastegate actuator 144 for sensing a wastegate temperature.

It will be noted that the wastegate temperature may include a temperature of the wastegate 142 as well as a temperature of the wastegate actuator 144. As such, the temperature of the wastegate may be substantially similar to the temperature of the wastegate actuator. Therefore, the temperature of the wastegate (or wastegate temperature) may be used interchangeably with the temperature of the wastegate actuator or with the temperature at the wastegate.

Exhaust gases from the turbine 16 and exhaust gases bypassing turbine 16 via wastegate 142 then flow through emission control device 70. In general, one or more emission control devices 70 may include one or more exhaust aftertreatment catalysts configured to catalytically treat the exhaust flow, and thereby reduce an amount of one or more substances in the exhaust flow.

Motor vehicle 102 further includes a cooling system 104 that circulates coolant through engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant (e.g., engine coolant temperature, ECT) may be regulated by a thermostat valve 38, located in the cooling line 82, which may be kept closed until the coolant reaches a threshold temperature. Additionally or alternatively, a temperature sensor (not shown), configured to deliver feedback signals to a controller, such as controller 12, may be included in the cooling line 82 to measure ECT.

In addition, engine system 100 may include a radiator fan 92 to provide airflow assistance and augment a cooling airflow through under-hood components. Radiator fan 92, coupled to radiator 80, may be operated when the motor vehicle 102 is moving and the engine 10 is running to provide cooling airflow assistance through radiator 80. As such, radiator fan 92 may be activated and operational (e.g., rotating) when motor vehicle 102 is traveling at lower speeds (e.g., lower than a speed threshold). At higher vehicle speeds, radiator fan 92 may be deactivated since sufficient ram air may be available for cooling under-hood components.

Radiator fan 92 may draw a cooling airflow into an under-hood compartment (not shown) through an opening at a front-end of motor vehicle 102, for example, through grille 112. In one example, radiator fan 92 may be operated for drawing cooling air through radiator 80, and/or for directing cooling airflow toward the CAC 18, engine cooling system 104, or other engine system components, such as a turbocharger, intake manifold, and/or a wastegate.

In one example, radiator fan 92 may be an electrically actuated engine cooling fan. For example, radiator fan rotation (and speed) may be controlled via an electrical input from an alternator and a system battery. In another example, the radiator fan may be operated by enabling a variable speed electric motor coupled to the radiator fan. Herein, controller 12 may command activation and/or a change in speed (e.g., rotational speed) of radiator fan 92 based on various engine conditions. In other embodiments, radiator fan 92 may be mechanically coupled to engine 10 via a clutch (not shown) and operating the radiator fan may include mechanically powering its rotation from engine rotational output via the clutch. It will be noted that when electrically actuated or when actuated via the clutch, radiator fan 92 may be deactivated and stopped when radiator fan operation is not desired. Alternatively, radiator fan 92 may be coupled to the engine accessory drive system, and may be driven by the engine crankshaft. As such, radiator fan 92 may not be deactivated (e.g., stopped) when driven by the engine crankshaft.

Radiator fan 92, when activated, may be capable of operation at different speeds. For example, radiator fan 92 may include each of a lower speed setting and a higher (e.g., faster) speed setting, such that all blades of the radiator fan may spin or rotate collectively at a slower speed or a faster speed, respectively. The radiator fan may also be deactivated and its rotation may be stopped when surplus airflow is not desired. In alternate embodiments, radiator fan 92 may operate at a single speed. It will be appreciated that though FIG. 1 depicts a single radiator fan 92, other example vehicles may include additional radiator fans (e.g., cooling fans coupled to the radiator).

Radiator fan rotation speed and/or direction may be controlled by controller 12 responsive to one or more engine operating conditions and/or at least one sensor, such as an ECT sensor (not shown). The speed of the radiator fan may also be based on the temperature at the wastegate 142 (and temperature at the wastegate actuator) exceeding a threshold temperature, as described below in reference to FIGS. 4-9.

Motor vehicle 102 further includes a grille system 110 including grille shutters 114 and a grille 112 providing an opening (e.g., a grille opening, a bumper opening, etc.) for receiving ambient airflow 116 through or near the front end of the vehicle and into an engine under-hood compartment. Grille shutters 114 may be selectively adjusted to regulate an amount of ambient airflow 116 that flows through grille 112. Such ambient airflow 116 may then be utilized by radiator 80, radiator fan 92, and other components to keep the engine and/or transmission cool. For example, ambient airflow 116 may pass across radiator 80 to aid in cooling the coolant passing through the engine and other engine components, such as the exhaust manifold and/or turbocharger housing.

Grille shutters 114 are moveable between a fully open position and a fully closed position (e.g., via a motor), and may be maintained at either position or a plurality of intermediate positions thereof. In other words, a degree of opening of grille shutters 114 may be increased or decreased. Specifically, the position of grille shutters may be adjusted to increase or decrease the degree of opening of the grille shutters. The position of the grille shutters 114 may be modified to control the amount of ambient airflow 116 entering the engine compartment (also termed, engine under-hood compartment) or cavity. In one example, adjusting the position of the grille shutters 114 include adjusting a size of a grille shutter opening resultant from a degree of inclination of grille shutters 114. The degree of inclination of grille shutters 114 may be estimated based on feedback from a grille shutter position sensor (not shown).

An amount of opening of the grille shutters 114 may be denoted by a percentage. As an example, the amount of grille shutter opening may be a percentage opening from 0-100%, where 0% is completely closed and 100% is completely open. Further, when the grille shutters are halfway between an opened and closed position, the grille shutters may be 50% open. For example, grille shutters 114 may be adjusted to be completely closed (e.g., 0% grille shutter opening) and substantially prevent the flow of ambient airflow 116 through grille 112, or may be adjusted to be completely open (e.g., 100% grille shutter opening) and allow a substantially unrestricted flow of ambient airflow 116 through grille 112. Furthermore, grille shutters 114 may be adjusted to any position between the fully closed and fully open (corresponding to a grille shutter opening between 0% and 100% respectively) positions. In this way, an engine front-end airflow (e.g., ambient airflow 116) may be adjusted by adjusting the position of grille shutter.

While this example refers to operation of grille shutters, various other devices may also be used that variably restrict airflow entering the engine compartment, such as a variable wing or spoiler, as one example, that can be adjusted to various angles including mid-point angles between maximum and minimum angle positions.

When grille shutters 114 are completely closed, there may be inadequate ambient airflow and ram air for the radiator fan 92 to circulate. On the other hand, when grille shutters 114 are completely open (or even partly open), ambient airflow 116 and ram air (when the motor vehicle is moving) may serve to circulate hot air out of the engine compartment, thereby reducing the ambient temperature within the engine compartment. Further, additional ambient air is provided for the radiator fan 92 to blow and circulate in the engine under-hood compartment. As such, increasing the opening of grille shutters 114 results in an increase of ambient airflow 116 and decreasing the opening of grille shutters 114 results in a decrease of ambient airflow 116.

The degree of opening of grille shutters may be adjusted in response to various operating conditions such as engine speed and load, and engine temperature. In addition, the degree of opening of grille shutters may be based on vehicle speed in order to improve one or more of fuel economy and engine performance. In one example, the aerodynamics of motor vehicle 102 may be improved with a fully closed grille shutter 114 via a streamlining of the front end of the vehicle, and therefore during some conditions a fully closed grille shutter may improve fuel economy. Further still, the degree of opening of the grille shutters may be modified based on wastegate temperature.

The grille shutters 114 may be actuated by a motor (not shown). The motor may be operatively coupled to controller 12. As an example, controller 12 may be communicably connected to grille shutter system 110, and may have instructions stored thereon to adjust (i.e. increasing and/or decreasing) the opening of grille shutters 114. The instructions may be responsive to one or more temperatures at the wastegate and/or the wastegate actuator and feedback from one or more temperature sensors such as an ECT sensor and exhaust manifold sensors (not shown). Based on engine operating conditions, controller 12 may command the motor to increase or decrease the opening of the grille shutters 114. For example, controller 12 may command the motor to increase the opening of the grille shutters 114 to 100% from 50% when increased ambient airflow is desired.

As mentioned earlier, wastegate 142 and wastegate actuator 144 may be exposed to high heat conditions due to their location adjacent to a turbine of a turbocharger receiving hot exhaust gases. The wastegate can reach high temperatures at which, for example, the wastegate actuator containing temperature-sensitive circuitry may degrade. As such, other components of the wastegate may also degrade. Therefore, to facilitate cooling of wastegate 142 including the wastegate actuator 144, a cooling duct 146 may be provided to route a portion of air 118 from downstream of the radiator fan 92 to the wastegate 142, wastegate actuator 144, and other associated components. Specifically, ambient airflow 116 entering through grille 112 may be dispersed by the radiator fan 92 and a portion of air 118 from the ambient airflow 116 may subsequently be directed to the cooling duct 146. In another example, the portion of air 118 may comprise a subset of the ambient airflow 116 received through the grilles 112 (e.g., a first amount of air) and a subset of ambient air present in the engine compartment (e.g., a second amount of air). In other words, the portion of air 118 may include each of air from the ambient airflow (e.g., the first amount of air) and air within the engine under-hood compartment (e.g., the second amount of air).

The cooling duct 146 may be configured to capture a portion of air (e.g., portion of air 118) blown from the radiator fan 92 and direct the portion of air onto the wastegate actuator 144, and thereby, wastegate 142 to provide cooling. As such, the portion of air 118 routed through the cooling duct 146 may enable cooling of each of a housing of the exhaust manifold and the turbocharger.

It will be noted that the cooling duct 146 may be a passive conduit, requiring no electronic or other controls. In other examples, a valve may be positioned within cooling duct 146 to enable or disable flow of the portion of air 118 therethrough. Other configurations of the cooling duct may be used without departing from the scope of this disclosure.

The cooling duct 146 may comprise a first end 152 positioned adjacent to and directly downstream the radiator fan 92 and a second end 154 positioned adjacent to at least one surface of the wastegate 142 including the wastegate actuator 144. Specifically, first end 152 may be arranged downstream of each of radiator fan 92 and grille shutters 114. In one example, the second end 154 may be positioned above a horizontal plane of the wastegate (and wastegate actuator), such that the portion of air 118 exiting the cooling duct 146 streams downward, or towards a lower location of the vehicle, as shown later in FIG. 2. In another example, the second end 154 is positioned on the same horizontal plane as the wastegate and wastegate actuator. Alternatively, the second end 154 is positioned below the horizontal plane of the wastegate and wastegate actuator, such that the portion of air 118 exiting the cooling duct 146 flows upwards towards a vertically higher location of the vehicle.

By positioning the first end 152 directly downstream of the radiator fan 92, a portion of air (i.e. portion of air 118) blown by the radiator fan may be re-directed though the cooling duct 146 to the wastegate 142 with sufficient velocity and pressure to enable cooling of the wastegate 142 and wastegate actuator 144.

As such, the cooling duct 146 may receive airflow at a higher velocity and/or higher pressure from a region adjacent to and downstream of the radiator fan, before the airflow generated by the radiator fan can diffuse throughout other regions of the engine under-hood compartment and lose its velocity and pressure. In one example, velocity of the portion of air 118 may be 3 meters per second. In another example, the velocity of the portion of air 118 conducted through cooling duct 146 may be 9 meters per second. A size and shape of cooling duct 146 may be selected such that sufficient airflow is transferred towards the wastegate actuator 144 allowing it to be cooled adequately. As such, adequate cooling may be a wastegate temperature that is nominally lower than a threshold temperature. In another example, adequate cooling may be the wastegate temperature being significantly lower than the threshold temperature.

In the depicted embodiment, the cooling duct 146 is configured to traverse through an engine cover 150. Further, the cooling duct 146 may be coupled (e.g., mechanically) to a frame of motor vehicle 102. Additional details of the arrangement of the cooling duct will be described in reference to FIG. 2 below.

To further enhance cooling of wastegate 142 and wastegate actuator 144 via cooling duct 146, a speed of the radiator fan 92 may be adjusted (e.g., increased). Specifically, the speed of the radiator fan may be adjusted responsive to an estimated wastegate temperature. Controller 12 may estimate temperature at the wastegate 142 (and therefore, at wastegate actuator 144) based on one or more engine operating conditions and/or measurements by at least one temperature sensor. For example, wastegate actuator temperature may be estimated based upon engine coolant temperature, engine oil temperature, exhaust temperature, exhaust manifold flange metal temperature model, vehicle speed, and ambient temperature.

The speed of radiator fan 92 may be adjusted to increase airflow through the cooling duct 146 in response to the wastegate temperature being above the threshold temperature. In one example, the threshold temperature may be 150° C. In another example, threshold temperature may be 180° C. Thus, in one example, if wastegate temperature is estimated to be higher than the threshold temperature, the speed of radiator fan 92 may be increased to accelerate air flow through cooling duct 146 and enable cooling of wastegate actuator 144 (and wastegate 142).

Further, in order to expedite cooling of wastegate 142, adjustments may be made to the grille shutters 114 to allow additional ambient air flow into the engine compartment, namely through increasing the opening of the grille shutters. In one example, grille shutters 114 may be opened (from a closed position) to allow more ambient airflow 116 into the engine under-hood compartment. If ram air speed (e.g., air flow through the grille shutters) is higher, portion of air 118 may be drawn from airflow through the grille shutters into cooling duct 146. Herein, increasing the opening of grille shutters 114 may allow a stream of ample ambient airflow to cool the engine and/or engine components.

If ram air speed is not sufficient, radiator fan 92 may be activated (if inactive) to augment air flow into the engine compartment, and into cooling duct 146. Alternatively, if radiator fan 92 is already activated (i.e. powered on) and spinning, the rotational speed of radiator fan 92 may be increased to accelerate cooling of the engine, wastegate actuator, and/or engine components. Thus, the speed (and activation) of radiator fan 92 may be adjusted in coordination with the position of grille shutters 114 to further increase airflow to the wastegate and other engine components. Alternatively, in a vehicle wherein a radiator fan is driven by the engine crankshaft, an engine of the vehicle may be kept running (e.g., active) for an additional 1-2 minutes to supply the airflow to the wastegate, wastegate actuator, and/or engine components until the temperature at the wastegate and wastegate actuator may be below a temperature threshold. Further, a signal may be provided to a user of the vehicle 102 to inform that wastegate cooling may be occurring. Accordingly, a subset of the increased ambient airflow 116, i.e. portion of air 118, may be received passively into cooling duct 146 (when radiator fan is deactivated) or may be blown by radiator fan 92 through cooling duct 146 to cool the wastegate 142 such that the temperature at the wastegate decreases below the temperature threshold.

Controller 12 may, thus, be configured to adjust a position of grille shutters to uncover or cover the grille, thereby increasing or decreasing ambient airflow into the engine, respectively. Moreover, the controller 12 may activate and/or adjust a speed of the radiator fan to further increase airflow to the engine components. Adjustments to one or more of the speed of the radiator fan and the position of the grille shutters may enable more rapid and effective cooling of the wastegate 142 including the wastegate actuator 144.

Further still, adjustments to the position of the grille shutters and radiator fan speed may also facilitate cooling of other engine components such as the turbocharger housing and exhaust manifold. In this way, the example engine system 100 of FIG. 1 may maintain integrity and durability of the wastegate including the wastegate actuator, as well as the turbocharger and the exhaust manifold.

FIG. 2 shows a schematic side view of motor vehicle 102 of FIG. 1. As such, components previously introduced in FIG. 1 are numbered similarly in FIG. 2 and not reintroduced. FIG. 2 schematically depicts an example layout of the cooling duct 146 within motor vehicle 102 relative to the grille shutters 114, radiator fan 92, engine 10, and associated ambient airflow 116. Radiator fan 92 includes a plurality of blades 202 and is depicted coupled within housing 204. The depicted example in FIG. 2 shows radiator fan 92 comprising 4 blades. However, other example radiator fans may include a different number of blades 202 without departing from the scope of the present disclosure.

As described earlier, grille shutters 114 may be adjusted to vary an amount of ambient airflow 116. In one example, grille shutters 114 may be included in a dual active grille shutter system comprising two groups of one or more grille shutters 114 configured to adjust the amount of airflow received through grille 112 (not shown in FIG. 2). In another example, the grille shutters 114 may be included in an active grille shutter system comprising only one group of one or more grille shutters 114. Moreover, in some embodiments, grille shutters 114 may be moved in coordination by the controller, such as controller 12 of FIG. 1. In other embodiments, grille shutters may be divided into groups and the controller may adjust opening/closing of each region independently. In alternative embodiments, grille shutters 114 may be a passive grille shutter system wherein the position of the grille shutters may not be adjusted and may remain stationary. As such, ambient airflow 116 may flow through these passive grille shutters during an entire drive cycle.

The engine cover 150 includes a passage 160 for the cooling duct 146 such that the engine cover 150 has a cooling duct inlet port 162 at one end and a cooling duct outlet port 164 at another end in which the cooling duct fits through. In one example, the cooling duct 146 may be securely and immovably fitted through the passage 160 such that the first end 152 and the second end 154 are substantially at a distance from the cooling duct inlet port 162 and cooling duct outlet port 164, respectively. The engine cover 150 may be positioned vertically against gravity above and/or on top of engine 10 when the motor vehicle 102 is sitting on a flat surface.

Cooling duct 146 may be designed as a hollow cylinder having only two openings (e.g., a first opening at the first end 152 and a second opening at the second end 154). The cooling duct 146 may be formed as a continuous body such as a tube or duct so that airflow may enter at the first end 152 and may exit through the second end 154. Specifically, a motive airflow through cooling duct 146 may occur substantially in one direction: from first end 152 to second end 154 of cooling duct 146. In other words, as shown in FIG. 2, cooling duct 146 is configured to gather the portion of air 118 adjacent to and immediately downstream of blades 202 of the radiator fan 92 and to channel the portion of air 118 to the wastegate 142 having the wastegate actuator 144. In particular, portion of air 118 is gathered downstream of each of grille shutters 114 and blades 202 of radiator fan 92.

As shown in FIG. 2, the first end 152 of cooling duct 146 is disposed towards the front end 106 of the motor vehicle 102, and the second end 154 of the cooling duct 146 is positioned proximal the wastegate 142 (which includes wastegate actuator 144) and adjacent to a housing of turbine 16. To further elaborate, the first end 152 of cooling duct 146 is located immediately adjacent to and downstream of the blades of radiator fan 92. Further, the second end 154 of cooling duct 146 is positioned at a location close to the wastegate 142, such that a significant portion of air flow exiting the cooling duct 146 may pass around and/or over wastegate 142. The portion of air (such as portion of air 118) streaming around and/or over the wastegate draws heat out away from the wastegate and dissipates the heat into the surrounding air.

In one example, a cross-sectional area of the first end 152 of cooling duct 146 may be greater than a cross-sectional area of the second end 154. This reduction of the cross-sectional area, and airflow path, of the cooling duct 146 causes an increase in each of the velocity and pressure of the portion of air 118 as the portion of air 118 reaches the wastegate 142 through second end 154 of the cooling duct 146. In another example, the cross-sectional area of the first end 152 of cooling duct 146 may be the same as the cross-sectional area of the second end 154. Further still, the cross-sectional area of the entire cooling duct 146 may be substantially the same as that at the first end 152 and the second end 154. Other embodiments may include variations in cross-sectional area of cooling duct 146 along its length without departing from the scope of this disclosure. Further still, cooling duct 146 may have a circular cross-section in one example. Alternatively, the cross-section of cooling duct 146 may be oval. Other cross-sections of the cooling duct 146 may also be used.

It will be appreciated that the cooling duct 146 may not include additional openings or apertures along the length of the cooling duct 146 other than the aforementioned first end 152 and second end 154. Furthermore, no intervening element or vehicle component(s) may be positioned between the first end 152 of the cooling duct 146 and radiator fan 92. Likewise, no element or vehicle component(s) may impede or interrupt a flow of the portion of air 118 as the portion of air 118 exits the cooling duct 146 at the second end 154 and cools the wastegate and wastegate actuator. In other words, the cooling duct 146 provides direct and unimpeded fluidic communication between the portion of air 118 blown by the radiator fan into first end 152 and the portion of air 118 exiting second end 154 towards wastegate 142. Further, a substantial amount of the portion of air 118 entering first end 152 of cooling duct 146 may be conducted through the length of cooling duct 146 and may exit towards wastegate 142 at second end 154. To elaborate, cooling duct 146 may be a hollow conduit for transferring the portion of air 118 from downstream of each of radiator fan 92 and grille shutters 114 towards the wastegate 142. As an example, cooling duct 146 may be a hollow cylindrical conduit.

Cooling duct 146 may be formed in a continuous manner and may be constructed from a durable material. Example materials may include metals, alloys, heat resistant plastics, etc. Various methods known in the art may be utilized to construct the cooling duct 146 including processes such as extruding, rolling, injection molding etc. and/or joining methods such as welding, adhesion, etc.

As mentioned earlier in reference to FIG. 1, the cooling duct 146 may traverse through engine cover 150 of engine 10. Engine cover 150 may be coupled (e.g., mechanically) to a cylinder head of engine 10. As such, engine cover 150 may be arranged on top of cylinder head of engine 10, relative to vertical. Further, in one example, the cooling duct 146 may be incorporated into the engine cover 150 such that the cooling duct 146 in the engine cover 150 may resemble one or more unrelated forms or features, such as human veins, if viewed from above. In yet another example, the cooling duct 146 incorporated into the engine cover 150 may increase a thickness of the engine cover (e.g., a thickness along the engine cover's width, height, and/or length) to enhance attractiveness of said cover, and/or to provide greater insulation to the engine, thereby reducing engine noise to a driver's cabin space. Engine cover 150 includes passage 160 for incorporating the cooling duct 146 such that a portion of the cooling duct may be securely and immovably fitted through passage 160. As such, the portion of cooling duct 146 may be encompassed within engine cover 150, specifically within passage 160 of engine cover 150. Passage 160 includes an inlet port 162 and an outlet port 164 for introducing the cooling duct 146. Specifically, the portion of cooling duct 146 included within engine cover 150 may fit between inlet port 162 and outlet port 164 of passage 160. Further, a remaining portion (e.g., excluding the portion of cooling duct fitted within passage 160 of engine cover 150) of cooling duct 146 may be external to engine cover 150. Inlet port 162 and outlet port 164 of passage 160 may be located opposite to each other. Thus, the portion of the cooling duct 146 may be securely and immovably fitted through the passage 160 such that the first end 152 and the second end 154 of cooling duct 146 are at a substantial distance from the inlet port 162 and outlet port 164 of passage 160, respectively. The engine cover 150 may be positioned above and/or on top of engine 10 in a vertical manner relative to gravity when the motor vehicle 102 is positioned on a substantially flat road.

Cooling duct 146 may be securely attached to the motor vehicle 102 via a plurality of attachment brackets (not shown) connected to various advantageous locations of the vehicle. Specifically, an outer wall 166 of the cooling duct 146 may be provided with attachment brackets (not shown) at spaced intervals along the length of the cooling duct and adjacent or intermediate the cooling duct inlet port 162 and cooling duct outlet port 164. The attachment brackets may couple a body frame of the vehicle to the cooling duct via a plurality of engagement pieces, such as nuts, bolts, screws, etc. (not shown). Cooling duct 146 may be securely attached to a frame of the motor vehicle 102 via a plurality of attachment brackets (not shown) connected to various locations of the frame of the vehicle body. Specifically, cooling duct 146 may be coupled via a number of attachment brackets at intervals along the length of the cooling duct. In one example, one or more attachment brackets may be coupled to cooling duct 146 adjacent to each of the inlet port 162 and outlet port 164 of passage 160. In the example of a uni-body construction of the vehicle, attachment brackets may couple cooling duct 146 to the body of the vehicle.

Thus, a system for a vehicle is provided, comprising: a radiator fan at a front end of the a vehicle, an engine coupled to an exhaust passage, a turbine positioned in the exhaust passage, a bypass conduit in fluidic communication with a turbine inlet and a turbine outlet, a wastegate positioned in the bypass conduit, and a wastegate actuator adjusting a position of the wastegate, the wastegate actuator receiving airflow from downstream of the radiator fan via a cooling duct.

FIG. 3 illustrates an example vehicle propulsion system 300. Vehicle propulsion system 300 includes a fuel burning engine 310 and a motor 320. Vehicle propulsion system 300 may be similar to or the same as motor vehicle 10. Engine 310 may be the same as engine 10 of FIGS. 1 and 2. As a non-limiting example, engine 310 comprises an internal combustion engine and motor 320 comprises an electric motor. Motor 220 may be configured to utilize or consume a different energy source than engine 310. For example, engine 310 may consume a liquid fuel (e.g., gasoline) to produce an engine output while motor 320 may consume electrical energy to produce a motor output. As such, a vehicle with propulsion system 300 may be referred to as a hybrid electric vehicle (HEV) (herein, also termed hybrid vehicle).

Vehicle propulsion system 100 may utilize a variety of different operational modes depending on operating conditions encountered by the vehicle propulsion system. Some of these modes may enable engine 310 to be maintained in an off state (i.e. set to a deactivated state) where combustion of fuel at the engine is discontinued. For example, under select operating conditions, motor 320 may propel the vehicle via drive wheel 330 as indicated by arrow 322 while engine 310 is deactivated.

During other operating conditions, engine 310 may be set to a deactivated state (as described above) while motor 320 may be operated to charge energy storage device 350. For example, motor 320 may receive wheel torque from drive wheel 330 as indicated by arrow 322 where the motor may convert the kinetic energy of the vehicle to electrical energy for storage at energy storage device 350 as indicated by arrow 324. This operation may be referred to as regenerative braking of the vehicle. Thus, motor 320 can provide a generator function in some embodiments. However, in other embodiments, generator 360 may instead receive wheel torque from drive wheel 330, where the generator may convert the kinetic energy of the vehicle to electrical energy for storage at energy storage device 350 as indicated by arrow 362.

During still other operating conditions, engine 310 may be operated by combusting fuel received from fuel system 340 as indicated by arrow 342. For example, engine 310 may be operated to propel the vehicle via drive wheel 330 as indicated by arrow 312 while motor 320 is deactivated. During other operating conditions, both engine 310 and motor 320 may each be operated to propel the vehicle via drive wheel 330 as indicated by arrows 312 and 322, respectively. A configuration where both the engine and the motor may selectively propel the vehicle may be referred to as a parallel type vehicle propulsion system. Note that in some embodiments, motor 320 may propel the vehicle via a first set of drive wheels and engine 310 may propel the vehicle via a second set of drive wheels.

In other embodiments, vehicle propulsion system 300 may be configured as a series type vehicle propulsion system, whereby the engine does not directly propel the drive wheels. Rather, engine 310 may be operated to power motor 320, which may in turn propel the vehicle via drive wheel 330 as indicated by arrow 322. For example, during select operating conditions, engine 310 may drive generator 360, which may in turn supply electrical energy to one or more of motor 320 as indicated by arrow 314 or energy storage device 350 as indicated by arrow 362. As another example, engine 310 may be operated to drive motor 320 which may in turn provide a generator function to convert the engine output to electrical energy, where the electrical energy may be stored at energy storage device 350 for later use by the motor.

Fuel system 340 may include one or more fuel tanks 344 for storing fuel on-board the vehicle. For example, fuel tank 344 may store one or more liquid fuels, including but not limited to: gasoline, diesel, and alcohol fuels. In some examples, the fuel may be stored on-board the vehicle as a blend of two or more different fuels. For example, fuel tank 344 may be configured to store a blend of gasoline and ethanol (e.g., E10, E85, etc.) or a blend of gasoline and methanol (e.g., M10, M85, etc.), whereby these fuels or fuel blends may be delivered to engine 310 as indicated by arrow 342. Thus, liquid fuel may be supplied from fuel tank 344 to engine 310 of the motor vehicle shown in FIG. 1. Still other suitable fuels or fuel blends may be supplied to engine 310, where they may be combusted at the engine to produce an engine output. The engine output may be utilized to propel the vehicle as indicated by arrow 312 or to recharge energy storage device 350 via motor 320 or generator 360.

In some embodiments, energy storage device 350 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 350 may include one or more batteries and/or capacitors.

Control system 390 may communicate with one or more of engine 310, motor 320, fuel system 340, energy storage device 350, and generator 360. Control system 390 may be the same or similar to control system 28 of FIG. 1. As will be described by the process flow of FIG. 4, control system 390 may receive sensory feedback information from one or more of engine 310, motor 320, fuel system 340, energy storage device 350, and generator 360. Further, control system 390 may send control signals to one or more of engine 310, motor 320, fuel system 340, energy storage device 350, and generator 360 responsive to this sensory feedback. Control system 390 may receive an indication of an operator requested output of the vehicle propulsion system from a vehicle operator 302. For example, control system 390 may receive sensory feedback from pedal position sensor 394, which communicates with pedal 392. Pedal 392 may refer schematically to a brake pedal and/or an accelerator pedal.

Energy storage device 350 may periodically receive electrical energy from a power source 380 residing external to the vehicle (e.g., not part of the vehicle) as indicated by arrow 384. As a non-limiting example, vehicle propulsion system 300 may be configured as a plug-in hybrid electric vehicle (HEV), whereby electrical energy may be supplied to energy storage device 350 from power source 380 via an electrical energy transmission cable 382. During a recharging operation of energy storage device 350 from power source 380, electrical transmission cable 382 may electrically couple energy storage device 350 and power source 380. While the vehicle propulsion system is operated to propel the vehicle, electrical transmission cable 382 may disconnected between power source 380 and energy storage device 350. Control system 390 may identify and/or control the amount of electrical energy stored at the energy storage device, which may be referred to as the state of charge (SOC).

In other embodiments, electrical transmission cable 382 may be omitted, where electrical energy may be received wirelessly at energy storage device 350 from power source 380. For example, energy storage device 350 may receive electrical energy from power source 380 via one or more of electromagnetic induction, radio waves, and electromagnetic resonance. As such, it should be appreciated that any suitable approach may be used for recharging energy storage device 350 from a power source that does not comprise part of the vehicle. In this way, motor 320 may propel the vehicle by utilizing an energy source other than the fuel utilized by engine 310.

Fuel system 340 may periodically receive fuel from a fuel source residing external to the vehicle. As a non-limiting example, vehicle propulsion system 300 may be refueled by receiving fuel via a fuel dispensing device 370 as indicated by arrow 372. In some embodiments, fuel tank 344 may be configured to store the fuel received from fuel dispensing device 370 until it is supplied to engine 310 for combustion. In some embodiments, control system 390 may receive an indication of the level of fuel stored at fuel tank 344 via a fuel level sensor. The level of fuel stored at fuel tank 344 (e.g., as identified by the fuel level sensor) may be communicated to the vehicle operator, for example, via a fuel gauge or indication in a vehicle instrument panel 396.

The vehicle propulsion system 300 may also include an ambient temperature/humidity sensor 398, and a roll stability control sensor, such as a lateral and/or longitudinal and/or yaw rate sensor(s) 399. The vehicle instrument panel 396 may include indicator light(s) and/or a text-based display in which messages are displayed to an operator. The vehicle instrument panel 396 may also include various input portions for receiving an operator input, such as buttons, touch screens, voice input/recognition, etc. For example, the vehicle instrument panel 396 may include a refueling button 397 which may be manually actuated or pressed by a vehicle operator to initiate refueling. For example, as described in more detail below, in response to the vehicle operator actuating refueling button 397, a fuel tank in the vehicle may be depressurized so that refueling may be performed.

In an alternative embodiment, the vehicle instrument panel 396 may communicate audio messages to the operator without display. Further, the sensor(s) 399 may include a vertical accelerometer to indicate road roughness. These devices may be connected to control system 390. In one example, the control system may adjust engine output and/or the wheel brakes to increase vehicle stability in response to sensor(s) 399.

Furthermore, vehicle propulsion system 300 may also include vehicle and engine components, such as a cooling duct (e.g., cooling duct 146), a radiator fan (e.g., radiator fan 92), grilles (e.g., grilles 112) and grille shutter (e.g., grille shutters 114).

FIGS. 4-9 present routines that may be carried out by a controller in the vehicle, such as controller 12 of motor vehicle 102. Instructions for carrying out these routines may be stored within the memory of the controller. Further, these routines may be executed by the controller.

Referring now to FIG. 4, an example routine 400 for adjusting each of a speed of a radiator fan and a position of grille shutters of the vehicle responsive to a temperature at a wastegate exceeding a temperature threshold is shown. Routine 400 may be executed as part of a method, which adjusts a speed of a radiator fan, such as radiator fan 92 of FIGS. 1 and 2, and a position of grille shutters, such as grille shutters 114 of FIGS. 1 and 2, to provide ambient airflow to a wastegate via a cooling duct (i.e. cooling duct 146).

Instructions for executing routine 400 may be stored within a controller (such as controller 12 shown in FIG. 1). The controller may execute routine 400 as described below. As such, the controller may determine the desired speed of the radiator fan and the desired position of grille shutters based on a temperature at the wastegate and engine operating conditions. The controller may then actuate the grille shutters and/or adjust radiator fan speed in response to the wastegate temperature and/or engine operating conditions.

At 402, routine 400 determines if the engine is "ON". For example, the engine may be "ON and activated for carrying out combustion, and the engine may be rotating. If the engine is not "ON", at 404, routine 400 proceeds to routine 600 if the vehicle is not a HEV, or to routine 700 if the vehicle is a HEV. For example, the engine may not be "ON" but may in an engine-off condition wherein the engine is at rest, and may not be combusting. Further still, if the vehicle is a HEV, the vehicle may be propelled by a motor and/or generator.

If it is determined at 402 that the engine is "ON", the routine continues to 406 and estimates and/or measures vehicle and engine operating conditions. Engine operating conditions may include engine speed and load, engine coolant temperature (ECT), pedal position, conditions of the CAC (e.g., temperature and pressure), ambient humidity, engine temperatures, etc. Vehicle conditions may include vehicle speed, a speed of the radiator fan, grille shutter position (actual feedback position from grille shutter position sensor), etc.

At 408, a temperature at the wastegate (also termed, wastegate temperature) may be estimated. The temperature at the wastegate, as described earlier, may be modeled and/or estimated using measurements of one or more engine operating conditions, such as engine speed and load, ECT, ambient conditions, and exhaust temperature. Next, at 410, it may be determined if the estimated temperature at the wastegate is greater than a threshold temperature, T1. The threshold temperature, T1, may be based on a temperature at which degradation of a wastegate actuator may begin to occur. In one example, the temperature threshold, T1, may be 150° C. In another example, the threshold temperature, T1, may be 180° C. In yet another example, the threshold temperature, T1, may be temperature distinct from those mentioned above.

If the estimated temperature at the wastegate is not above the threshold temperature (T1), routine 400 may continue to 412 to adjust the speed of the radiator fan based on ECT, vehicle speed, CAC efficiency, etc. Alternatively, if the estimated wastegate temperature is greater than the threshold temperature, T1, routine 400 continues to 414 to determine if the grille shutters are open or in an open position. The open position of the grille shutters may include one of a partly open position, mostly open position, and a fully open position, or any position that is not fully closed. To elaborate, the grille shutters may be considered open, in one example, when a percentage opening of the grille shutters is greater than 5%. In another example, the grille shutters may be determined to be open when the percentage opening is 15%. Herein, ambient air flow may stream into the engine compartment when the grille shutters are opened. The controller may determine whether the grille shutters are open or closed based on feedback from a grille shutter position sensor.

As described earlier, an amount of opening and/or open position of the grille shutters may be designated by a percentage. In one example, an "open grille shutter position" or an "open position of the grille shutters" may refer to a grille shutter position that is providing a percentage grille shutter opening that is greater than 10%. Similarly, a "closed grille shutter position" or a "closed position of the grille shutters" may refer to a grille shutter position that provides a percentage grille shutter opening that is less than 5%. Further, in one example a "fully open" position of the grille shutters may refer to a percentage opening between 95-100% of the grille shutters. In another example, the grille shutters may be considered to be fully open when the percentage opening of the grille shutters is exactly 100%. Further still, a "fully closed" or "completely closed" position of the grille shutters may refer to a percentage opening in the range of 0-5%. In yet another example, the grille shutters may be determined to be fully closed when the percentage opening in the grille shutters is 0%. As such, the percentage opening of the grille shutters may vary between 0% and 100% based on engine conditions and vehicle conditions. For example, at high vehicle speeds, the grille shutters may be adjusted to a more closed position wherein the percentage opening is 20%. Further still, it will be appreciated that the percentage opening of the grille shutters may be 50%, 75%, 25%, or a percentage opening therebetween. Thus, the position of the grille shutters may be adjusted to a fully closed position, a fully open position, or any position between the fully closed and fully open positions.

If the grille shutters are determined to be in the open position, routine 400 continues to 424, where the radiator fan is activated (if inactive) or the speed of the radiator fan is increased (if the radiator fan is active and operational). For example, the radiator fan may be deactivated when additional cooling is not desired such as when the vehicle is traveling at higher speeds enabling a sufficient quantity of ram air. Alternatively, the radiator fan may be activated and may be rotating at a given speed when the vehicle is traveling at lower speeds without sufficient ram air. If the radiator fan is inoperative, routine 400 may activate the radiator fan at 424 to enable radiator fan rotation at a first, lower speed. Herein, for example, the radiator fan may spin at a default speed upon activation. In one example, the default speed may be a lower speed setting. If the radiator fan is activated, routine 400 may adjust the speed of the radiator fan at 424. Herein, the radiator fan speed may be adjusted (e.g., increased) to a higher speed setting. It will be noted that a rotational speed of blades of the radiator fan, such as blades 202 of radiator fan 92 in FIG. 2, may be faster on the higher speed setting compared to the lower speed setting. Further still, if the radiator fan is operating at the higher speed setting (e.g., a maximum speed) and the radiator fan speed cannot be increased, routine 400 may maintain the higher speed setting at 424 to enable cooling of the wastegate.

With the grille shutters in the open position, cooling duct (e.g., cooling duct 146 of FIGS. 1 and 2) may be conducting a smaller portion of air towards the wastegate. Since the wastegate temperature is determined to be higher than the threshold temperature, the portion of air being conducted by the cooling duct may need to be augmented. Accordingly, the radiator fan may be activated or its speed may be increased, if already activated.

In an alternative example, routine 400 may adjust the grille shutters to their fully open position, if the degree of opening of the grille shutters is less than 100% at 414, before activating and/or increasing the radiator fan speed.

However, if the grille shutters are not open (e.g., fully closed) at 414, routine 400 continues to 416. At 416, routine 400 confirms if existing engine and vehicle conditions allow a change in position of the grille shutters (i.e. a change in position that maybe appropriate, advantageous and/or practicable considering one or more engine and vehicle operating conditions). In particular, it may be determined if the vehicle and/or engine conditions permit a change in the position of the grille shutters towards a more open position where ambient air flow to the engine compartment is increased. Routine 500 of FIG. 5 may be performed to determine if the grille shutters may be adjusted such that their opening is increased. In brief, routine 500 may assess if the grille shutters may be opened based on vehicle speed.

As such, there may be engine and vehicle conditions where changes in position of the grille shutters may be tolerated without affecting engine and/or vehicle performance. In addition, there may be conditions where adjustments to the position of grille shutters may be limited or constrained. For example, if the vehicle is cruising on a highway, the grille shutters may be mostly closed (e.g., opening of 10%) or fully closed (e.g., opening of 0%) to reduce ram air flow into the engine compartment. By closing grille shutters, aerodynamic drag on the vehicle may be reduced enabling an increase in fuel economy. In this situation, the position of the grille shutters may not be moved to a more open position for cooling the wastegate as it would adversely affect engine performance. Thus, if it is determined at 416 that the grille shutters cannot be opened (e.g., increase in the degree of opening of the grille shutters), routine 400 continues to 424 where the radiator fan may be activated (if inactive) or the radiator fan speed may be increased (if the radiator fan is operational).

In alternative embodiments, the position of the grille shutters may be adjusted in response to the wastegate temperature exceeding the temperature threshold even if engine and/or vehicle conditions may not allow the adjustment. In particular, the grille shutters may be adjusted to a more open position when engine and/or vehicle conditions desire a more closed position of the grille shutters. For example, the initial (e.g., closed) position of the grille shutters may be overridden and the grille shutters may be opened (e.g., to a more open position) if the wastegate temperature remains higher than the threshold temperature, T1, in excess of a certain duration.

If it is confirmed at 416 that the grille shutters can be opened, then routine 400 continues to 418 to adjust the grille shutters to an open position. Herein, the position of the grille shutters may be adjusted from a fully closed position (e.g., 0% opening) to a mostly open (e.g., 75% opening) position. In another example, the opening of the grille shutters may be adjusted from 5% opening to 80% opening.

The amount (or degree) of opening or the position, of the grille shutters may be determined by engine and vehicle operating conditions, including vehicle speed. For example, if the vehicle is traveling at higher vehicle speeds on a highway, routine 400 may adjust the opening of the grille shutters to 40% at 418. Herein, the degree of opening of the grille shutters may be increased from 0% to 40%. If the vehicle is traveling at lower speeds and the grille shutters are initially (e.g., when determined at 414) fully closed or mostly closed, routine 400 may adjust the grille shutters to a mostly open or fully open position at 418.

After adjustments to the grille shutter are executed at 418, a portion, such as the portion of air 118 described in FIG. 1, of air received (e.g., ambient air flow 116 in FIGS. 1 and 2) via the open grille shutters may be gathered by the cooling duct, and may be directly streamed to the wastegate and wastegate actuator, at 419, to provide cooling. If the radiator fan is actuated, additional air may be directed by the radiator fan towards the first end of the cooling duct and transferred via the second end of the cooling duct to the wastegate. At 420, routine 400 may again confirm if the wastegate temperature is greater than the threshold temperature, T1. If wastegate temperature is determined to be less than the threshold temperature (T1), routine 400 proceeds to 426. At 426, the grille shutters may be adjusted according to engine operating conditions, including vehicle speed, engine speed and load, ECT, driving conditions, etc. For example, the grille shutters may be adjusted to a more closed position, such as from 40% to 5%, if the motor vehicle is traveling at a higher speed (e.g., above the speed threshold).

Alternatively, if at 420, it is confirmed that the wastegate temperature remains higher than the threshold temperature, T1, the grille shutters may be optionally opened at 422 to a fully open position, if allowable. For example, if the opening of the grille shutters at 418 is 40%, the grille shutters may be adjusted to an opening of 80%, if vehicle and engine conditions permit the adjustment. Herein, the increase in grille shutter opening may be allowed if vehicle speed has reduced when the grille shutters are in fully open position, the grille shutters have the percentage opening between 95-100%. In this way, the controller may open the grille shutters to the fully open position in order to supply cooler ambient airflow upstream of the radiator fan when the wastegate remains above the threshold temperature, T1.

Next, routine 400 continues to 424 to activate the radiator fan or to increase the speed of the radiator fan if the radiator fan is already actuated. For example, the radiator fan may be actuated in addition to opening the grille shutters if the wastegate temperature remains higher than the threshold temperature at 420. In the example where the grille shutters are adjusted to the fully open position at 422, the radiator fan may be activated or its speed may be increased to augment the air flow received via the fully open grille shutters.

It will be appreciated that the radiator fan when initially actuated may be activated to a low speed setting. Further, if the wastegate temperature remains higher than the threshold temperature, T1, the radiator fan speed may be increased to a faster speed setting.

In this way, ambient air flow entering the engine compartment from the front end of the vehicle via the grille shutters may be used to cool the wastegate. In one example, the air flow entering the engine compartment may be directed to the wastegate via the cooling duct without actuating the radiator fan. In another example, ambient air flow through the grille shutters opening may be directed by the radiator fan towards the cooling duct and may be streamed to the wastegate and wastegate actuator. As a result, cooling of the wastegate and its components may be achieved easily and effectively.

Figure 5:
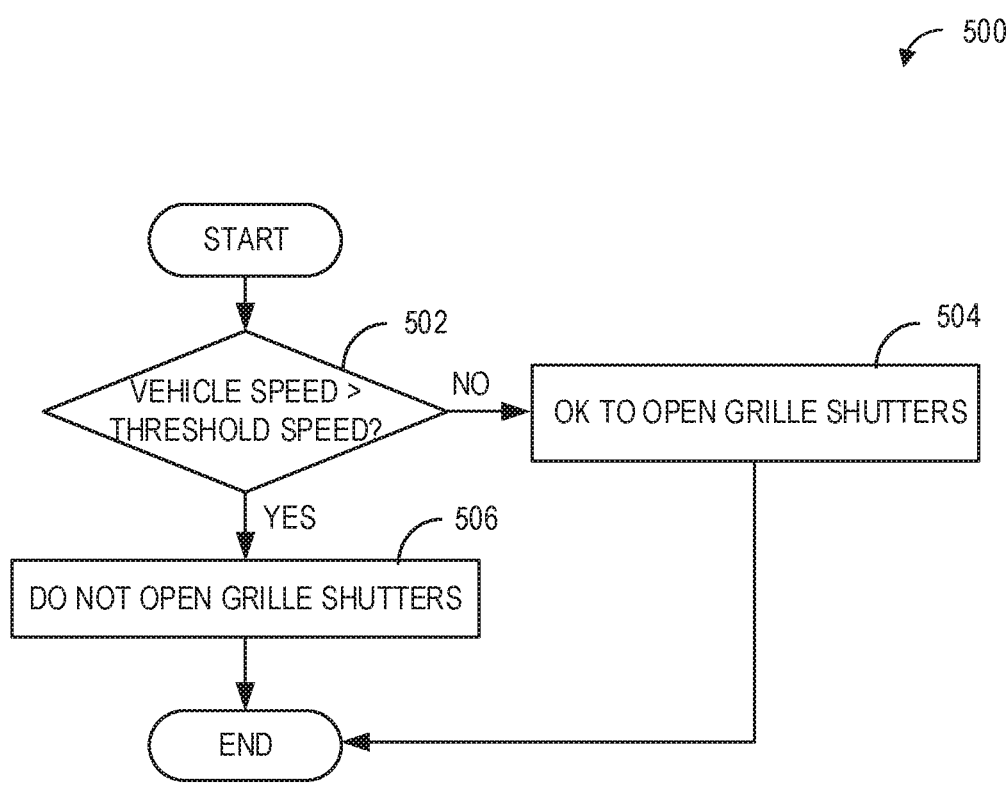
FIG. 5 shows an example method for determining a position of grille shutters based on vehicle speed.
Figure 6:
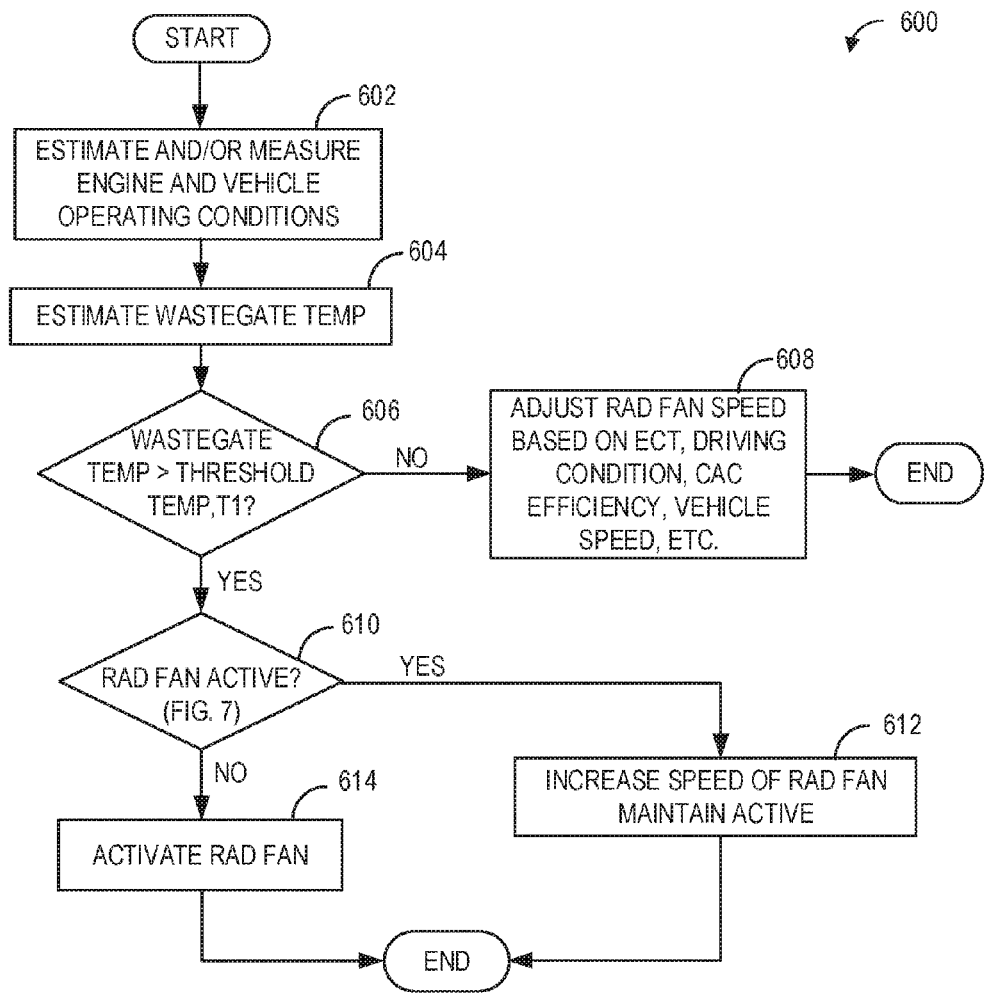
FIG. 6 demonstrates an example method for adjusting speed of a radiator fan based on wastegate temperature.

Turning now to FIG. 5, an example routine 500 is provided to determine if vehicle conditions (and/or engine conditions) permit an opening (or an increase in the opening) of the grille shutters. Routine 500 may be performed at 416 of routine 400. Specifically, the degree of opening of the grille shutters may be based on a moving speed (also termed, vehicle speed) of the vehicle. At 502, routine 500 determines whether vehicle speed (e.g., a moving speed of the vehicle) is above a threshold speed. In one example, the threshold speed may be a moving speed at which significant aerodynamic drag may occur particularly if the grille shutters are in an open position. For example, the threshold speed may be 60 miles per hour. In another example, the threshold speed may be 70 miles per hour. If the vehicle speed is above the threshold speed, then, at 506, routine 500 determines that engine and/or vehicle conditions do not permit opening the grille shutters. Thus, the grille shutters may be maintained closed and may not be adjusted at 418 to an open position. However, if the vehicle speed is determined to be less than the threshold speed, routine 500 progresses to 504 to determine that the grille shutters may be opened. Specifically, the grille shutters may be adjusted to a more open position in response to the wastegate temperature being higher than the threshold temperature, T1, at 418 of routine 400. Herein, the vehicle speed may not be high enough such that air flow through the grille shutters into the engine compartment adversely affects fuel consumption. Routine 500 then ends and returns to 418 of routine 400 (FIG. 4).

Thus, a method for a boosted engine in a vehicle may comprise adjusting each of a speed of a radiator fan and a position of grille shutters of the vehicle responsive to a temperature at a wastegate exceeding a temperature threshold. The method may further comprise streaming air from downstream of each of the radiator fan and the grille shutters to the wastegate via a cooling duct. In one embodiment, the position of the grille shutters may be based on a moving speed of the vehicle. Herein, the position of the grille shutters may be at a more open position when the moving speed of the vehicle is lower than a speed threshold or in a more closed position when the moving speed of the vehicle is higher than the speed threshold. In addition, the method may further comprise adjusting the position of the grille shutters to a fully open position responsive to the temperature at the wastegate exceeding the temperature threshold, the adjusting including an increase in a degree of opening of the grille shutters.

The method may further include adjusting the speed of the radiator fan responsive to the temperature at the wastegate remaining higher than the temperature threshold, the adjusting including increasing the speed of the radiator fan. Moreover, the method may also include adjusting the speed of the radiator fan responsive to each of the temperature at the wastegate exceeding the temperature threshold and the more closed position of the grille shutters, the adjusting including increasing the speed of the radiator fan. However, the method may also comprise overriding the position of the grille shutters in response to the temperature at the wastegate exceeding a temperature threshold, the overriding including adjusting the position of the grille shutters to a more open position.

Collectively, the routines illustrated in FIGS. 4-5 may result in sufficient cooling of a wastegate and wastegate actuator via opening of grille shutters and activation and/or increased speed of the radiator fan during a condition wherein a temperature at the wastegate is above the threshold temperature. Opening of grille shutters allows an increased amount of ambient air flow into the engine compartment such that the radiator fan may channel a greater amount of air directly through a cooling duct, such as cooling duct 146, to a location upstream of the wastegate and wastegate actuator. In this way, routines 400 and 500 may reduce the temperature of the wastegate and aid in preventing degradation of the wastegate actuator.

The example system introduced earlier may further comprise grille shutters positioned at the front end of the vehicle and a controller with computer readable instructions stored in non-transitory memory for, in response to a temperature at a wastegate actuator exceeding a threshold temperature, during a first condition, increasing a speed of the radiator fan (e.g., at 424 in response to the moving speed being higher than the speed threshold) and during a second condition, increasing the speed of the radiator fan and opening the grille shutters (e.g., at 424 in response to moving speed being lower than the speed threshold). The first condition may include a speed of the vehicle higher than a threshold speed, and wherein the second condition may include the speed of the vehicle lower than the threshold speed.

FIG. 6 shows an example routine 600 for adjusting a radiator fan independent of the position of the grille shutters or for vehicles wherein the grille shutters cannot be actively controlled. Specifically, routine 600 adjusts a speed of the radiator fan in response to a wastegate temperature in excess of a threshold temperature.

At 602, routine 600 estimates and/or measures vehicle and/or engine operating conditions. Engine and vehicle operating conditions may include engine speed and load, vehicle speed, a speed of the radiator fan, grille shutter position, engine temperature, etc. At 604, a temperature at the wastegate may be estimated and stored by controller 12. The temperature at the wastegate may be estimated, as described earlier at 408, based on one or more engine conditions, such as ECT, ambient temperature, exhaust temperature, etc.

At 606, it may be determined if the estimated temperature at the wastegate at 604 is greater than the threshold temperature, T1. The threshold temperature may be the same as threshold temperature described in reference to FIG. 4, wherein the threshold temperature may be based on a temperature at which degradation of and/or damage to a wastegate actuator may occur. If the estimated temperature at the wastegate is not above the threshold temperature, T1, the routine continues to 608 and the radiator fan speed may be adjusted based on existing conditions such as ECT, driving conditions, CAC efficiency, vehicle speed, etc.

Alternatively, at 606, if the estimated wastegate temperature is greater than the threshold temperature, T1, routine 600 continues to 610 where routine 600 determines if the radiator fan is active and operational. For example, the radiator fan may be deactivated if the vehicle is moving at higher speeds with sufficient ram air to cool the engine compartment. Alternatively, the radiator fan may be active and spinning at a given speed when ambient conditions include a higher ambient temperature and vehicle speed is slower. Routine 700 shown in FIG. 7 may be performed to determine if the radiator fan is active.

Figure 7:
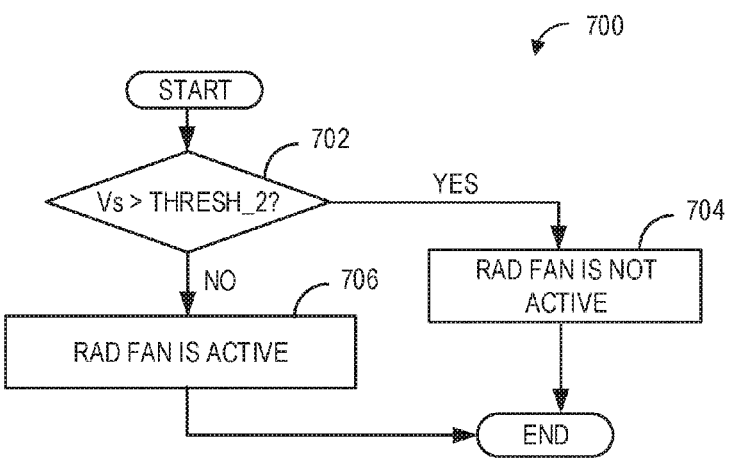
FIG. 7 illustrates an example method for determining activation of a radiator fan based vehicle speed.

FIG. 7 illustrates a routine 700 to determine if the radiator fan is activated, or powered on. At 702, it is confirmed if the moving speed of the vehicle (e.g., vehicle speed) is greater than a threshold speed, Thresh_2. For example, at higher speeds, the radiator fan may be "OFF" (e.g., deactivated) in most vehicles because the air flow introduced into the engine compartment via grille system by the forward motion of the vehicle (e.g., ram air) may be adequate to cool the engine and engine components. In one example, the threshold speed, Thresh_2, may be the same as the threshold speed, Thresh_1, of routine 500 in FIG. 5. In another example, the threshold speed, Thresh_2, may be distinct from threshold speed, Thresh_1. For example, Thresh_2 may be 40 miles per hour. In another example, Thresh_2 may be 50 miles per hour. In yet another example, during a condition in which the vehicle is towing a heavy trailer and traveling up an inclined road, Thresh_2 may be a lower threshold speed than during a second condition in which the vehicle is unattached to a heavy trailer and traveling up the inclined road. If the vehicle speed is higher than Thresh_2, routine 700 proceeds to 704 to determine that the radiator fan is deactivated. As such, sufficient ram air may flow through the engine compartment and the radiator fan may be inoperative.

Alternatively, if the vehicle speed is lower than Thresh_2, the radiator fan is likely to be "ON" (e.g., activated) and rotating, since ram air may not be sufficient to cool the engine and engine components. Thus, at 706, routine 700 determines that the radiator fan is activated. After a confirmation of the activation status of the radiator fan, routine 700 ends.

It will be appreciated that though routine 700 determines a status of the radiator fan based on vehicle speed alone, radiator fan operation may also be based on engine temperature e.g. ECT. For example, if the ECT is determined to be higher than a threshold (e.g., coolant temperature threshold), the radiator fan may be actuated to draw ambient air into the engine compartment to cool the engine. However, if the ECT is determined to be lower than the coolant temperature threshold, the radiator fan may be deactivated.

Returning now to 610 of routine 600 in FIG. 6, if it is determined that the radiator fan is active, routine 600 continues to 612. At 612, the speed of the active radiator fan may be increased. Herein, the term active refers to a state of the radiator fan wherein the radiator fan is powered on and the blades (e.g., blades 202 of FIG. 2) of the radiator fan are spinning at a rotational speed. In one example, the radiator fan may be active and in the aforementioned low speed setting, as described in reference to FIG. 1. Since the wastegate temperature is higher than threshold temperature, T1, even though the radiator fan is spinning at the low speed setting, routine 600 may increase the speed of the radiator fan in response to the wastegate temperature. In this example, if the radiator fan is in the low speed setting, the controller may send additional instructions to the radiator fan to adjust the radiator fan speed to a faster or higher speed setting. Herein, the blades of the radiator fan may spin at a faster speed compared to the speed at the low speed setting.

Alternatively, if it is determined at 610 that the radiator fan is not active based on routine 700, then the radiator fan may be activated, or powered on, at 614. In one example, the radiator fan may be activated initially to the low speed setting. In another example, the radiator fan may be activated to a higher speed setting immediately, skipping the low speed setting, in order to expedite cooling of the wastegate and wastegate actuator. The routine may end after activation of the radiator fan, and/or after increasing the speed of the radiator fan.

Collectively, the methods illustrated in FIGS. 6-7 may result in sufficient cooling of a wastegate and wastegate actuator via activation and/or increased speed of a radiator fan when a temperature at the wastegate is above a threshold temperature in a vehicle where adjustments to grille shutters are not desired, advantageous, or practical. The radiator fan, such as radiator fan 92, may channel a portion of air directly through a cooling duct, such as cooling duct 146, to a location upstream of the wastegate and wastegate actuator to provide a stream of cooling air. In this way, routines 600 and 700 may reduce the temperature of the wastegate and aid in preventing degradation of the wastegate actuator.

In another representation, a method for a boosted engine may comprise, in response to a temperature of a wastegate exceeding a threshold temperature, during a first condition, activating a radiator fan, and conducting air from downstream of the radiator fan to the wastegate via a cooling duct, and during a second condition, increasing a speed of the radiator fan, and conducting air from downstream of the radiator fan to the wastegate via the cooling duct. Herein, the first condition may include a vehicle speed above a threshold speed (e.g., Thresh_2) and second condition includes the vehicle speed being lower than the threshold speed (e.g., Thresh_2).

Turning now to FIG. 8, a routine 800 to adjust a speed of a radiator fan based on wastegate temperature following an engine shut down is provided. Specifically, routine 800 may be performed in a non-hybrid vehicle.

At 802, routine 800 confirms if the engine is shut down. Herein, engine shut down refers to an engine that is not carrying out combustion. Further still, the engine shut down condition also refers to an engine at rest wherein the engine is not rotating. If the engine is not shut down, routine 800 progresses to 804 to continue to routine 400, as described in regard to FIG. 4, which may be activated when the engine is "ON".

If the engine is confirmed to be shut down and at rest, routine 800 proceeds to 806, where a wastegate temperature is estimated and stored by the controller. For example, the engine may be recently shut down and the wastegate may be at a higher than desired temperature following engine shut down. The temperature at the wastegate may be estimated as described earlier in reference to 408 of routine 400.

At 808, it may be determined by routine 800 if the estimated temperature at the wastegate is greater than a threshold temperature, such as T1 of routine 400 and routine 600. In another example, the threshold temperature in routine 800 may be distinct from the threshold temperatures in routines 400 and 600 described in FIGS. 4 and 6 respectively. For example, a threshold temperature for routine 800 may be 120° C. If the estimated temperature at the wastegate is not higher than the threshold temperature, routine 800 continues to 810. At 810, the radiator fan may be deactivated and powered off and the grille shutters may be closed, if an active grill system. As such, the radiator fan may be deactivated and the grille shutters may be closed following engine shut down.

However, if the estimated temperature at the wastegate is greater than the threshold temperature, routine 800 continues to 812 to determine if the grille shutters are open and the radiator fan is on (i.e. active and spinning at the low or high speed setting). In one example, the grille shutters may be fully opened (e.g., percentage opening of grille shutters of 95-100%) and the radiator fan may be activated and on the high-speed setting. In another example, the degree of opening of the grille shutters may be 50% and the fan may be activated at a low speed setting. If it is determined that the grille shutters are opened and the radiator fan is activated, then at 814, the radiator fan speed is maintained (if at the high speed setting) and no adjustments are made to the position of the grille shutters. Though not shown in FIG. 8, if the radiator fan is determined to be rotating at the low speed setting, routine 800 may increase the speed of the fan to the high speed setting at 814.

If it is not confirmed that the grille shutters are opened and the radiator fan is on and active, then routine 800 proceeds to 816. As such, the grille shutters may be opened but the radiator fan may not be actuated. In another example, the radiator fan may be actuated but the grille shutters may be substantially closed (e.g., degree of opening of the grille shutters may be 10%). Accordingly, at 816, routine 800 may activate (i.e., power on) the radiator fan and/or open the grille shutters. For example, if the radiator fan is determined to be deactivated at 812, routine 800 may actuate the radiator fan to an initial default setting (i.e. a low speed setting) at 816. In another example, if the radiator fan is active at the low speed setting at 812, routine 800 may increase the speed of the radiator fan at 816. In yet another example, if the radiator fan is determined to be inoperative at 812, routine 800 may increase the speed of the radiator fan directly to the high speed setting at 816.

Similarly, if the grille shutters are determined to be closed at 812, the position of the grille shutters may be adjusted to increase the amount of grille shutter opening at 816. For example, the grille shutters may be adjusted to the fully open position (e.g., percentage opening of grille shutters of 95-100%) from a mostly closed position (e.g., percentage opening of grille shutters at 15%). In another example, the grille shutters may be adjusted from a 50% degree of opening to a 100% degree of opening at 816 in response to the wastegate temperature being higher than the threshold temperature. Thus, the radiator fan, such as radiator fan 92, may receive air via grilles 112 and channel a portion of air, e.g., portion of air 118, through a cooling duct, such as cooling duct 146, to the wastegate and wastegate actuator to provide a stream of cooling air after the engine is shut down.

Routine 800 then proceeds to 820 to determine if the duration of radiator fan operation (e.g., after 816 wherein the radiator fan may be actuated from an "OFF" position or wherein the speed of the radiator fan is increased to the high speed setting) after engine shut down is substantially equal to a pre-determined duration, herein referred to as "Td". In one example, Td may be 120 seconds as measured subsequent to engine shut down. In another example, Td may be 150 seconds. In yet another example, Td may be 90 seconds. The pre-determined duration may be based upon a state of charge of a battery in the vehicle.

If the duration of radiator fan operation after engine shut down is substantially equal to the pre-determined duration, Td, routine 800 proceeds to 824 to shut down the radiator fan, such that the radiator fan has no rotational speed and is deactivated and at rest. Further, routine 800 closes the grille shutters such that the grille shutters have a percentage opening of less than 5%, for example. In another example, the grille shutters may not be adjusted to a fully closed or mostly closed position after the pre-determined duration. Instead, the grille shutters may be maintained substantially open (e.g., 50% opening, 75% opening, or 100% opening). It will be noted that routine 800 shuts down the radiator fan when the pre-determined duration is substantially complete. The radiator fan may not be operated beyond the pre-determined duration as the state-of-charge of the vehicle battery may be reduced. In another example, if a powertrain control module (PCM) of the vehicle detects that the vehicle battery may have insufficient power and charge, the PCM may alert the driver of the vehicle via a warning shown on an information center on a front dash, for example, that the vehicle battery should be replaced and battery power and charge are low. If the driver fails to replace the vehicle battery, the PCM may allow the engine to keep running for an additional 1-2 minutes after key off to provide cooling to the wastegate, wastegate actuator, and/or other engine components.

If the duration of radiator fan operation after engine shut down is not substantially equal to the predetermined duration, Td, but is less than Td, routine 800 continues to 822 to determine if the temperature at the wastegate is lower than the threshold temperature. If it is determined that the estimated temperature at the wastegate higher than the threshold temperature, routine 800 returns to 814, where the radiator fan remains activated and cooling air is directed towards the wastegate via the cooling duct. As such, the radiator fan may be spinning at either the low speed or at the high speed setting. If, however, the estimated wastegate temperature is less than the threshold temperature at 822, routine 800 proceeds to 824 to shut down the radiator fan, such that the radiator fan has no rotational speed and is deactivated. In addition, at 824, the grille shutters may be closed.

Thus, in a non-hybrid vehicle, the radiator fan may be deactivated earlier than the pre-determined duration responsive to the wastegate temperature decreasing below the threshold temperature. Further, the radiator fan may be deactivated once the pre-determined duration is completed (e.g., to maintain sufficient battery charge for a subsequent engine start) in spite of the wastegate temperature being higher than the threshold temperature.

Thus, an example method for a boosted engine in a vehicle may comprising following engine shut down to an engine-off condition, estimating a temperature at a wastegate, and if the temperature at the wastegate exceeds a threshold temperature, increasing a speed of a radiator fan for a pre-determined duration, and directing cooling airflow towards the wastegate via a cooling duct. The method may further comprise opening grille shutters of the vehicle for the pre-determined duration. The method may also comprise closing the grille shutters and deactivating the radiator fan after the pre-determined duration. Further, the method may close the grille shutters and deactivate the radiator fan responsive to the temperature at the wastegate decreasing below the temperature threshold before the pre-determined duration Turning now to FIG. 9, it depicts routine 900 for adjusting a speed of a radiator fan after an engine shut down in a HEV. Specifically, the radiator fan may be active and operational until a reduction in wastegate temperature is achieved following an engine shut down in a hybrid vehicle.

At 902, routine 900 confirms if the engine is "OFF" and the HEV is in an electric-mode. Specifically, the electric-mode refers to a state of vehicle propulsion in which the electric motor propels the vehicle. As such, a vehicle battery provides wheel torque for the vehicle and the engine is maintained shutdown (e.g., at rest).

If the engine not shut down and the HEV is not in the electric-mode, routine 900 continues to 904 wherein routine 400 of FIG. 4 may be initiated. Routine 900 may then end.

However, if the engine is confirmed to be "OFF" (e.g., shut down and at rest without performing combustion) and the HEV is in the electric-mode, routine 900 proceeds to 906, where a temperature at a wastegate is estimated and stored by the controller. The temperature at the wastegate may be estimated as described earlier in routines 400, 600, and 800.

At 908, it may be determined if the estimated temperature at the wastegate is higher than a threshold temperature, e.g., T1 of routine 400. The threshold temperature may be the same threshold temperature of FIG. 4. As an example, the threshold temperature may be 150° C. In other examples, the threshold temperature in routine 900 may be distinct from the threshold temperature, T1, of FIG. 4. Further still, the temperature threshold of FIG. 9 may be different from the threshold temperatures of routines 600 and 800.

If the estimated temperature at the wastegate is not above the threshold temperature, routine 900 continues to 910. At 910, the radiator fan speed may be adjusted based on ECT, ambient conditions, vehicle speed, etc.

On the other hand, if the estimated temperature at the wastegate is greater than the threshold temperature, routine 900 continues to 912 to determine if the grille shutters are open and the radiator fan is on (i.e. active and spinning at the low or high speed setting). In one example, the position of the grille shutters may be based on an existing vehicle speed of the hybrid vehicle. Thus, if the hybrid vehicle is traveling at lower speeds, the grille shutters may be fully opened (e.g., percentage opening of grille shutters at 95-100%). If the hybrid vehicle is traveling at a faster speed, the grille shutters may be adjusted to a more closed position reducing the ambient air flow into the engine compartment, and reducing air drag. In another example, the radiator fan may be activated at the high speed setting if the vehicle is traveling at slower speeds and the ambient temperature is higher.

If it is determined that the grille shutters are opened and the radiator fan is activated, then at 916, the radiator fan speed is maintained and no adjustments may be made to the position of the grille shutters may be made by the controller. Though not shown in FIG. 9, if the radiator fan is determined to be rotating at the low speed setting, routine 900 may increase the speed of the fan to the high speed setting at 916. Further still, if vehicle conditions allow an increased opening of the grille shutters, routine 900 may adjust the position of the grille shutters to a relatively more open position. For example, if the grille shutters are at a partly open position (e.g., 25% degree of opening), routine 900 may adjust the position of the grille shutters to a more open position (e.g., 50% degree of opening). In another example, if the degree of opening of the grille shutters is 50%, based on vehicle conditions, routine 900 may increase the opening to 70%.

If, on the other hand, it is not confirmed at 912 that the grille shutters are opened and the radiator fan is active, routine 900 proceeds to 918. At 918, the radiator fan may be activated and the grille shutters may be adjusted to a more open position. As mentioned earlier, the position of the grille shutters may further depend on vehicle speed. As such, if vehicle conditions do not allow an increase in the opening of the grille shutters, the opening of the grille shutters may not be increased. The radiator fan may be activated to an initial default setting (i.e. a low speed setting), or may be immediately increased to the high-speed setting. It will be noted that if the radiator fan is operable at only one speed, the radiator fan may be actuated to spin at its lone speed at 918. Consequently, actuation of the radiator fan with (or without) an increase in the opening of the grille shutters may enable an increase in transfer of cooling air through the cooling duct towards the wastegate and wastegate actuator to provide a stream of cooling air.

Routine 900 then proceeds to 920 to determine if the estimated temperature at the wastegate is lower than the threshold temperature. Herein, the actuation of the radiator fan (along with an opening of the grille shutters) may have cooled the wastegate sufficiently below the threshold temperature. If yes, routine 900 continues to 922 to adjust the speed of the radiator fan based on a desired cooling of the engine. For example, the radiator fan speed may be reduced if engine components are at a higher temperature than desired. In another example, if the engine compartment is cooled sufficiently, the radiator fan may be deactivated and its rotation may be stopped. Similarly, the position of the grille shutters may be adjusted based on vehicle conditions. For example, if the vehicle speed is lower, the grille shutters may be maintained at their mostly open position. If the vehicle speed is higher and a reduction in aerodynamic drag is desirable, the grille shutters may be adjusted to the fully closed position.

In contrast, if at 920, the estimated temperature at the wastegate is not less than the threshold temperature, routine 900 returns to 914, where the radiator fan remains activated at a given rotational speed. Herein, the radiator fan may be maintained active following engine shut down until the wastegate temperature is substantially below the threshold temperature.

In another representation, an example hybrid vehicle system may comprise an engine, a generator coupled to a battery, vehicle wheels propelled using torque from one or more of the engine and the generator, grille shutters coupled to a front end of the vehicle, a radiator fan coupled to the front end of the vehicle downstream of the grille shutters, a turbocharger with an exhaust turbine coupled to an exhaust passage, a wastegate positioned within a bypass conduit, the bypass conduit in fluidic communication with an inlet of the exhaust turbine and an outlet of the exhaust turbine, a wastegate actuator adjusting a position of the wastegate, a cooling duct, a first end of the cooling duct positioned downstream of each of the grille shutters and the radiator fan, a second end of the cooling duct located adjacent to the wastegate actuator, and a controller with computer readable instructions stored in non-transitory memory for following an engine shutdown, estimating a temperature at the wastegate actuator, and if the temperature at the wastegate actuator exceeds a threshold temperature, increasing a speed of the radiator fan, directing cooling air flow towards the first end of the cooling duct, and transferring the cooling air flow via the second end of the cooling duct towards the wastegate actuator. The controller may include further instructions for deactivating the radiator fan in response to the temperature at the wastegate decreasing below the threshold temperature.

As such, the routines illustrated in FIGS. 8-9 may enable sufficient cooling of a wastegate and wastegate actuator following engine shutdown. In particular, the routines 800 and 900 comprise increasing an opening of grille shutters (when vehicle conditions allow the increasing) and activation of (or an increase in speed of) a radiator fan responsive to a temperature at the wastegate being above threshold temperature. Routine 800 in a non-hybrid vehicle may activate the radiator fan for a pre-determined duration following engine shut down. Routine 900 may activate the radiator fan or maintain active the radiator fan until the wastegate temperature is lower than the threshold temperature. Execution of routine 800 and/or routine 900 allow an increased amount of ambient airflow into the engine compartment such that the radiator fan may channel a greater portion of air directly through a cooling duct, such as cooling duct 146, to the wastegate and wastegate actuator. In this way, routines 800 and 900 may reduce the temperature of the wastegate and reduce degradation of the wastegate including the wastegate actuator.

FIG. 10 includes graph 1000 illustrating an example adjustment to a position of grille shutters and/or a speed of a radiator fan in response to a temperature at a wastegate in a vehicle. Specifically, graph 1000 shows changes in wastegate temperature at plot 1002, changes in radiator fan speed at plot 1004, changes in grille shutter opening (represented as a percentage) at plot 1006, engine condition at plot 1008, and changes in vehicle speed at plot 1010. As such, the engine condition may be "ON" where the engine is combusting and spinning powering the vehicle, or it may be "OFF" where the engine is not combustion, and is shut down and at rest. The radiator fan in this example may be deactivated, or may be rotating at either a low speed or at a high speed. The grille shutter opening may vary between fully closed (as 0% opening), fully open (such as 100% opening), or any opening in between (e.g., 50% opening). Time is plotted along the x-axis, and time increases from the left of the x-axis to the right. Further, a threshold temperature (e.g., T1) at the wastegate is represented by line 1001 while a threshold vehicle speed, such as Thresh_1, is represented at 1007.

Prior to time t1, the engine is "OFF", the vehicle may be stopped or at rest, the radiator fan may be "OFF" (no rotation), and the wastegate temperature may be lower (e.g., ambient temperature or lower), such that the wastegate temperature is below the temperature threshold, T1 (line 1001). The grille shutter percentage opening may be 0% such that the grille shutters are closed. At time t1, the engine is activated to "ON" and may begin combusting. As such, the example may be an engine hot start and not a cold start. The vehicle begins moving at t1 at a vehicle speed below a threshold speed, Thresh_1 (line 1007). Since the vehicle speed is below the threshold speed (line 1007) aerodynamic drag may not significantly affect fuel economy. Further, since the engine has experienced a hot start, the grille shutters may be fully opened, having a percentage opening of 100%, to allow ambient air flow to cool the engine and engine components. Likewise, the radiator fan may be activated and may be rotating at the low speed setting to further expedite cooling of engine components. However, despite these features that promote cooling, during a condition such as hard driving and/or subsequent to a hot soak, the wastegate temperature may increase significantly between t1 and t2.

Thus, at t2, the wastegate temperature may reach the threshold temperature T1. T1 may be a temperature at or above which a wastegate actuator and its associated circuitry may begin to degrade or be damaged. In one embodiment, the threshold temperature T1 may be 150° C. In another embodiment, T1 may be 180° C. In response to the wastegate temperature being greater than the temperature threshold T1, the speed of the radiator may be increased by switching to the high speed setting from the low speed setting at time t2. As the vehicle speed is still below the threshold speed, the grille shutters may continue to be in the open position with a percentage opening of 100%. The increased fan speed may enable a higher airflow through the cooling duct towards the wastegate. Thus, between time t2 and t3, the wastegate temperature may reduce such that at t3, the wastegate temperature decreases to the threshold temperature, T1 (line 1001).

At time t3, the vehicle speed reaches the threshold speed, Thresh_1 (line 1007). As an example, the vehicle may be cruising on a highway. Since the vehicle is rising above the threshold speed, air flow through the fully open grille shutters adversely affect aerodynamic drag, thereby reducing fuel economy. Thus, at time t3, the grille shutters may be commanded closed, such that the opening of the grille shutters is decreased to a percentage opening of 0%. In another example, the grille shutters may be commanded to a mostly closed position, e.g., a percentage opening of 15%. Additionally, because the temperature of the wastegate is below the threshold temperature T1 at t3, the radiator fan may be deactivated. Moreover, since the vehicle is traveling at a higher speed, ambient air circulation in the engine compartment may cool the engine and engine components.

At time t4, though, the wastegate temperature may rise sufficiently to exceed the threshold temperature, T1 (line 1001). For example, ambient air temperature may be higher and wastegate heat may not be dissipated to the atmosphere. Since the vehicle is traveling at a speed above the threshold speed Thresh_1, opening the grille shutters may increase aerodynamic drag. Accordingly, the grille shutters may not be adjusted (e.g., adjusted to a more open position) due to potential aerodynamic drag and a reduction in fuel economy. Thus, only the radiator fan is activated at t4 to the low speed setting. The wastegate temperature decreases slightly between t4 and t5, but remains higher than the threshold temperature T1 (line 1007). Consequently, at time t5, the radiator fan speed is adjusted. Specifically, the radiator fan speed is increased by switching to the high speed setting at time t5.

The temperature at the wastegate begins to decline between time t5 and time t6 due to the increased speed of the radiator fan blowing ambient air through the cooling duct to the wastegate. At time t6, the wastegate temperature reduces to below the threshold temperature T1. Thus, the speed of the radiator fan is reduced to the low speed setting in response to the reduction in wastegate temperature. The radiator fan may not be deactivated at t6 since the engine compartment and other engine components may desire further cooling. Between time t6 and time t7, vehicle speed reduces. For example, a driver of the vehicle may be exiting the highway. At time t7, the vehicle speed reaches the speed threshold Thresh_1, and reduces below the speed threshold. Herein, ambient airflow into the engine compartment may not adversely affect aerodynamic drag and may not significantly affect fuel economy. Therefore, the size of the grille shutters opening may be increased. As shown at time t7, the grille shutters may be in their fully open position having a percentage opening of 100%. Concomitantly, the radiator fan may remain operational at the low speed setting. At time t8, a vehicle drive cycle comprising all events between time t1 and time t8 ends.

A duration of time may pass between time t8 and time t9 wherein the vehicle is operational and traveling. At time t9, thus, the engine continues to power the vehicle, and the vehicle is moving at a speed greater than the speed threshold Thresh_1. Further, at time t9, the wastegate temperature is higher than the threshold temperature T1. Because the vehicle is traveling at a speed above the threshold speed, the grille shutters may be fully closed (e.g., percentage opening of 0%). As such, the grille shutters may not be commanded to open due to potential aerodynamic drag. In response to the wastegate temperature being higher than the threshold, the radiator fan may be actuated at the high-speed setting. For example, the ambient temperature may be sufficiently high such that radiator fan rotation may not produce adequate circulation, or direct sufficient air flow through the cooling duct.

Between time t9 and time t10, the wastegate temperature does not fall below the threshold temperature T1. In response, the grille shutters may be opened by overriding their initial closed position. The opening of the grille shutters may be increased at time t10 to about 50% opening regardless of the vehicle speed being higher than the threshold speed. Herein, the grille shutters may be adjusted to a more open position from closed, in order to expedite cooling of the wastegate and help reduce thermal degradation of the wastegate. In other words, fuel consumption may increase (due to increased air drag) between time t10 and time t11 when the grille shutters are opened but the wastegate may be cooled at the expense of fuel economy during a condition where the wastegate is experiencing thermal stress.

At time t10, the grille shutters may be adjusted to a halfway point e.g. 50% opening between fully closed (0% open) and fully open (100% open). In alternate examples, the commanded grille shutter position may be a less open position (i.e. percentage opening of 25% or a more open position (i.e. percentage opening between 75%). The grille shutters may not be opened to a fully opened position in order to reduce excessive aerodynamic drag, thereby avoiding loss in fuel economy. In this way, the controller may facilitate more ambient air flow upstream of the radiator fan so that the radiator fan may blow an increased amount of the ambient air flow through the cooling duct to the wastegate.

Between t10 and t11, the temperature at the wastegate declines but the temperature at the wastegate remains above the threshold temperature T1. In response, at time t11, the grille shutters may be adjusted to the fully open position, such that the percentage opening is 95-100%, for example. Between time t11 and t12, the vehicle may experience increased aerodynamic drag and reduced fuel economy. Concomitantly, though, the temperature at the wastegate decreases as a result of the increased ambient airflow through the grilles and higher speed of radiator fan flowing air through the cooling duct to the wastegate.

By time t12, the wastegate temperature is reduced to a temperature below the threshold temperature T1. Therefore, the opening of the grille shutters is decreased back to a fully closed position (e.g., percentage opening of 0-5%). This may promote optimal fuel economy due to a reduction in the aerodynamic drag caused by airflow through grille shutters in the open position. However, no adjustments may be made to the radiator fan. Accordingly, the speed of the radiator fan may continue to be high (i.e. at the high speed setting) in order to provide high velocity cooling air to the wastegate. In another example, the speed of the radiator fan may be reduced to a lower speed by switching to the low speed setting. In yet another example, the radiator fan may be turned off. Between time t12 and time t13, the wastegate temperature remains below the threshold temperature. At time t13, a vehicle cycle comprising all events between time t9 and time t13 ends.

Between time t13 and time t14, a duration may pass wherein the engine continues to operate. Prior to time t14, the vehicle may have experienced hard driving, for example, such that the wastegate temperature is higher than the threshold temperature. At time t14, the engine may be shut down as the vehicle comes to a rest. In other words, the engine is not carrying out combustion. The temperature at the wastegate is above the threshold temperature T1 between time t14 and time t15. Because the vehicle is stopped, the grille shutters may be at an open position. In one example, the grille shutters may be fully opened, e.g., comprise a percentage opening of 100%. In another example, the grille shutters may mostly open (e.g., percentage opening of 80%). Further, the radiator fan may be at the low speed setting such that the speed of the radiator fan is low. The radiator fan may be actuated since the vehicle speed is slow before the vehicle comes to a complete halt.

At time t15, the temperature at the wastegate is higher than the threshold temperature T1 following engine shut down. Thus, in response to the wastegate temperature exceeding the threshold temperature, at time t15, the speed of the radiator fan may be increased. Consequently, the wastegate temperature reduces as it receives cooling air flow from the cooling duct. The radiator fan may be activated at the high speed setting for a pre-determined duration, denoted here as Td (i.e. in this example, a duration between time t15 and time t16). In one example, the pre-determined duration Td may be approximately 120 seconds. In another example, Td may be 150 seconds. As stated earlier, the pre-determined duration may be based upon a state of charge of the system battery.

At time t16, the pre-determined duration elapses and the grille shutters are commanded to close, such that the grille shutters are in a closed position with a percentage opening of 0-5%, for example. In addition, the radiator fan is turned off, or deactivated by the controller even though wastegate temperature is slightly higher than the threshold temperature at time t16. The wastegate temperature may reduce slightly due to ambient air circulation but its temperature decrease may not be aided by air flow via the cooling duct.

In this way, the wastegate and its associated actuator may be cooled reducing thermal degradation. By using ambient air flow from downstream of each of the radiator fan and the grille shutters to cool the wastegate, substantial air flow is assured during different vehicle and engine conditions. The wastegate may be further cooled following engine shut down by maintaining the radiator fan active beyond engine shutdown. Thus, durability and functionality of the wastegate may be extended.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine in a vehicle, comprising:
in response to a temperature of a wastegate exceeding a threshold temperature:
during a first condition, activating a radiator fan, and thereby conducting air from downstream of the radiator fan to the wastegate via a cooling duct, and
during a second condition, increasing a speed of the radiator fan, and thereby conducting air from downstream of the radiator fan to the wastegate via the cooling duct.

2. The method of claim 1, wherein the first condition includes a vehicle speed above a threshold speed.

3. The method of claim 2, wherein the second condition includes the vehicle speed being lower than the threshold speed.

4. The method of claim 1, further comprising:
adjusting each of the speed of the radiator fan and the position of the grille shutters when the vehicle is at rest at engine shutdown responsive to the temperature at the wastegate exceeding the temperature threshold.

5. The method of claim 1, wherein air enters the cooling duct through an inlet of the cooling duct and exits the cooling duct through an outlet of the cooling duct, the outlet disposed at a front end of the vehicle in proximity of the radiator fan and the outlet disposed between a front wheel and a rear wheel of the vehicle in proximity of a wastegate actuator.

6. A hybrid vehicle system comprising:
an engine,
a generator coupled to a battery,
vehicle wheels propelled using torque from one or more of the engine and the generator,
grille shutters coupled to a front end of the vehicle,
a radiator fan coupled to the front end of the vehicle downstream of the grille shutters,
a turbocharger with an exhaust turbine coupled to an exhaust passage,
a wastegate positioned within a bypass conduit, the bypass conduit in fluidic communication with an inlet of the exhaust turbine and an outlet of the exhaust turbine,
a wastegate actuator adjusting a position of the wastegate,
a cooling duct, a first end of the cooling duct configured to receive air from activating the radiator fan, positioned downstream of each of the grille shutters and the radiator fan,
a second end of the cooling duct located adjacent to the wastegate actuator.

7. The system of claim 6, further comprising a controller with computer readable instructions stored in non-transitory memory for following an engine shutdown, estimating a temperature at the wastegate actuator, and if the temperature at the wastegate actuator exceeds a threshold temperature, increasing a speed of the radiator fan, directing cooling air flow towards the first end of the cooling duct, and transferring the cooling air flow via the second end of the cooling duct towards the wastegate actuator.

8. The system of claim 7, wherein the controller includes further instructions for deactivating the radiator fan in response to the temperature at the wastegate decreasing below the threshold temperature.

9. The system of claim 8, wherein the second end of the bypass conduit is positioned between front and rear wheels of the vehicle.

10. The system of claim 9, wherein the wastegate is positioned between front and rear wheels of the vehicle.

* * * * *